US011023960B1

(12) United States Patent
Frederick et al.

(10) Patent No.: US 11,023,960 B1
(45) Date of Patent: Jun. 1, 2021

(54) SYSTEM AND METHOD FOR E-COMMERCE ACCESSIBILITY

(71) Applicants: David Frederick, Weehawken, NJ (US); Darren G. Floyd, New York, NY (US); Daniel J. Bernard, New York, NY (US)

(72) Inventors: David Frederick, Weehawken, NJ (US); Darren G. Floyd, New York, NY (US); Daniel J. Bernard, New York, NY (US)

( * ) Notice: Subject to any disclaimer, the term of this patent is extended or adjusted under 35 U.S.C. 154(b) by 88 days.

(21) Appl. No.: 16/401,267

(22) Filed: May 2, 2019

Related U.S. Application Data

(63) Continuation-in-part of application No. 15/136,031, filed on Apr. 22, 2016, now Pat. No. 10,311,506, which is a continuation-in-part of application No. 13/853,751, filed on Mar. 29, 2013, now Pat. No. 9,430,784.

(60) Provisional application No. 62/151,059, filed on Apr. 22, 2015, provisional application No. 61/618,481, filed on Mar. 30, 2012.

(51) Int. Cl.
G06Q 30/06 (2012.01)
G06Q 20/40 (2012.01)
G06Q 30/02 (2012.01)
G06Q 30/08 (2012.01)

(52) U.S. Cl.
CPC ..... *G06Q 30/0641* (2013.01); *G06Q 20/4016* (2013.01); *G06Q 30/0239* (2013.01); *G06Q 30/0633* (2013.01); *G06Q 30/0643* (2013.01); *G06Q 30/08* (2013.01)

(58) Field of Classification Search
CPC .......... G06Q 30/0641; G06Q 30/0643; G06Q 30/08; G06Q 30/0239; G06Q 30/0633; G06Q 20/4016
USPC ................... 705/26.1, 27.1, 26.3, 27.2, 26.8
See application file for complete search history.

(56) References Cited

U.S. PATENT DOCUMENTS

| | | | |
|---|---|---|---|
| 7,457,778 B2 | 11/2008 | Li et al. | |
| 7,610,218 B2 | 10/2009 | Bodmer et al. | |
| 8,175,928 B2 | 5/2012 | Klinger et al. | |
| 8,200,537 B2 | 6/2012 | Pike et al. | |
| 8,239,533 B2 | 8/2012 | Leahy et al. | |
| 9,697,563 B2 | 7/2017 | Fitzpatrick | |
| 9,870,116 B1* | 1/2018 | Yasskin | G06F 21/51 |
| 2002/0111907 A1 | 8/2002 | Ling | |
| 2003/0004816 A1* | 1/2003 | Byers, Jr. | G06Q 30/0633 705/26.8 |
| 2008/0010120 A1 | 1/2008 | Chung et al. | |
| 2008/0183593 A1 | 7/2008 | Dierks | |
| 2008/0189190 A1 | 8/2008 | Ferber | |

(Continued)

FOREIGN PATENT DOCUMENTS

| | | | |
|---|---|---|---|
| GB | 2404483 | 2/2005 | |
| WO | WO-2016182400 A1 * | 11/2016 | ............ H04W 80/12 |

OTHER PUBLICATIONS

"72Lux White Label Universal Checkout and Shoppable Technology", <<http://www.72lux.com>>, accessed on May 29, 2014.

(Continued)

*Primary Examiner* — Yogesh C Garg
(74) *Attorney, Agent, or Firm* — Ostrolenk Faber LLP

(57) ABSTRACT

Disclosed are a system and a method enabling E-Commerce transactions without redirecting a user's computer from one electronic publishing page to another electronic publishing page.

19 Claims, 36 Drawing Sheets

(56) References Cited

U.S. PATENT DOCUMENTS

| | | |
|---|---|---|
| 2008/0208761 A1 | 8/2008 | Autry et al. |
| 2008/0288405 A1* | 11/2008 | John ............... G06Q 20/40 705/44 |
| 2009/0216633 A1 | 8/2009 | Whitsett et al. |
| 2010/0106564 A1 | 4/2010 | Manesh et al. |
| 2010/0106565 A1 | 4/2010 | Manesh et al. |
| 2010/0114739 A1 | 5/2010 | Johnston |
| 2010/0257043 A1 | 10/2010 | Kassaei et al. |
| 2010/0261454 A1 | 10/2010 | Shenfield |
| 2010/0299212 A1 | 11/2010 | Graylin et al. |
| 2011/0016021 A1 | 1/2011 | Manning |
| 2011/0099088 A1 | 4/2011 | Berrios et al. |
| 2011/0178932 A1* | 7/2011 | Johnson ............ G06Q 30/06 705/53 |
| 2012/0095881 A1 | 4/2012 | Rothman |
| 2012/0116897 A1 | 5/2012 | Klinger et al. |
| 2012/0123910 A1 | 5/2012 | George |
| 2012/0150666 A1 | 6/2012 | Savie |
| 2012/0150667 A1 | 6/2012 | Salari |
| 2012/0203661 A1 | 8/2012 | Baharloo et al. |
| 2012/0290374 A1 | 11/2012 | Tedjamulia |
| 2013/0144662 A1 | 6/2013 | Waring |
| 2015/0302470 A1 | 10/2015 | Dru |

OTHER PUBLICATIONS

"What We Do, 8th Bridge, Social Commerce Platform", <<http://www.8thbridge.com/what-we-do>>, accessed on May 29, 2014.

V.A. Kansara, "The Next Chapter of Content and Commerce Integration", <<http://wwvv.businessoffashion.com/2012/11/fashion-2-0-the-next-chapter-of-content-and-commerce-integration.html>> dated Nov. 20, 2012 and 2014 accessed on May 29, 2014.

Facebook Messenger Commerce Overview accessed in 2016.

Kuehl, Claudia, "Spam's Good Twin," Publication title Internet World, vol. 6, Issue 9, Pagination 31, Publication Date May 1, 2000, Publisher Penton Media, Inc.

\* cited by examiner

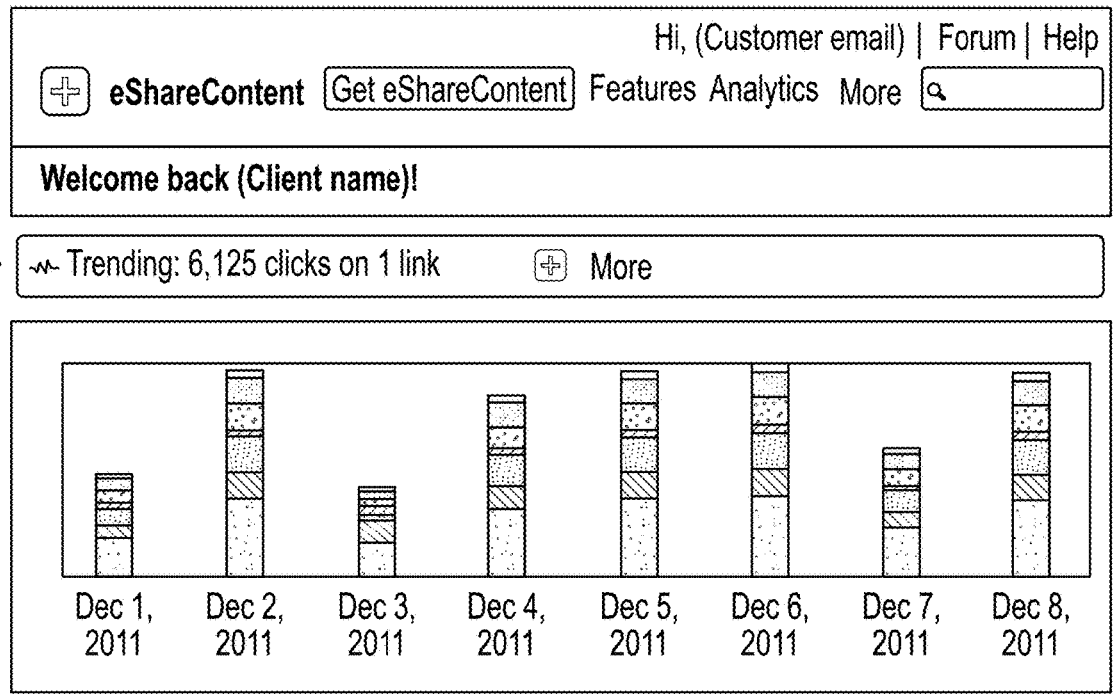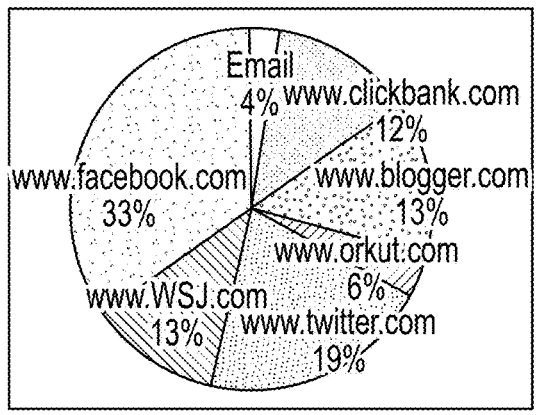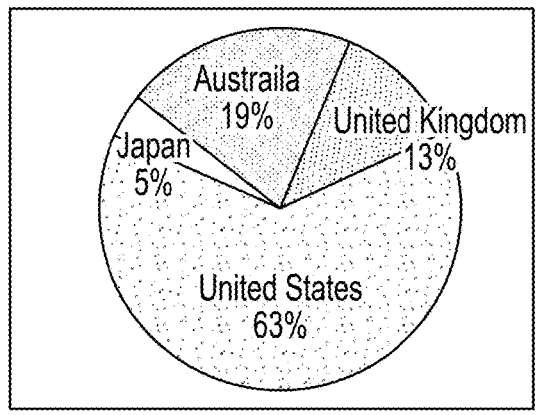
FIG. 16

DEOXY COMMERCE DIAGNOSTICS

| Feed Name | Feed Source | Feed Health | Last Heartbeat | 24 hr Dropped Transactions | Volume | Integration Type | LATENCY | UPTIME |
|---|---|---|---|---|---|---|---|---|
| Payment Gateway | Paymentech | | 28 minutes ago | 1 | 9999 Orders | API | | |
| Tax Table | Taxware | | 28 minutes ago | 7 | 9993 Orders | FTP | | |
| Fraud Detection | Kount | | 48 minutes ago | 4 | 9996 Orders | API | | |
| Promotions | Smile.io | | 35 minutes ago | 2 | 9998 Orders | API | | |
| Loyalty | Smile.io | | 15 seconds ago | 0 | 10000 Orders | API | | |
| Images | Shopify | | 28 minutes ago | 1 | 9999 Orders | API | | |
| Descriptive Copy | Shopify | | 15 seconds ago | 0 | 10000 Orders | API | | |
| Pricing | Shopify | | 35 minutes ago | 2 | 9998 Orders | API | | |
| Branding | Shopify | | 15 seconds ago | 0 | 10000 Orders | API | | |
| Color Schemes | Shopify | | 28 minutes ago | 1 | 9999 Orders | API | | |
| Inventory | Netsuite | | 15 seconds ago | 0 | 10000 Orders | FTP | | |

SYSTEM AND METHOD FOR E-COMMERCE ACCESSIBILITY

CROSS-REFERENCE TO RELATED APPLICATIONS

The present application is a continuation-in-part of U.S. patent application Ser. No. 15/136,031, filed Apr. 22, 2016, which claims priority to U.S. Provisional Application Ser. No. 62/151,059, filed Apr. 22, 2015. U.S. patent application Ser. No. 15/136,031 is also a continuation-in-part of U.S. patent application Ser. No. 13/853,751, filed Mar. 29, 2013 (now U.S. Pat. No. 9,430,784, issued Aug. 30, 2016), which claims priority to U.S. Provisional Application Ser. No. 61/618,481, filed Mar. 30, 2012. The entire disclosure of each of these applications is incorporated by reference herein.

FIELD OF THE INVENTION

The present invention relates to a method and a system for conducting an electronic transaction on a network of computers, and more particularly to an electronic sales transaction via a network of computers.

Definitions

A web page or webpage as used herein refers to an electronic document/file residing on a computer (sometimes referred to as a server) in a network of computers that may be accessed by a web browser for the purpose of displaying information including text, graphics and the like to a user via an electronic display.

A web site or website refers to a set or a collection of interrelated web pages residing on a computer or a number of computers in a network of computers and accessible by a user via an electronic address typically referred as a uniform resource locator (URL) or web address.

A browser or web browser refers to a software application for accessing, retrieving, presenting (displaying), and traversing information residing on computers in a network of computers including websites, web pages, weblogs (blogs) or the like.

Click and its grammatical variations refers to operating a pointing device associated with a computer (e.g. a mouse) to select an item on the electronic display of the computer, which leads to the activation of a command or function which is executed by the computer associated with the display.

E-commerce refers to a series of electronically executed steps over a publicly accessible network of computers (e.g. Internet) that at the very least includes steps for offering a product or a service for sale by a seller or a seller's agent and steps for collection of payment information (e.g. credit card information) from a buyer.

Electronic publishing page refers to any electronically transmittable computer readable file for the display of content such as text, graphics, or a combination of text or graphics or the like on an electronic display such a computer monitor including a graphical/photographic display advertising unit, a textual advertising unit, a textual editorial content (i.e., blogs), a graphical display editorial content (i.e. digital banners), a dynamic display unit such as video content or animated content, a user-generated social commentary and/or imagery, a sponsored (paid) social commentary and/or imagery, or a hybrid of any of these.

BACKGROUND AND SUMMARY OF THE INVENTION

A conventional method of inducing an e-commerce transaction includes offering a product through electronic advertising via a computer network.

A well-known method of conducting e-commerce includes electronic advertising by displaying a graphic on a webpage of a website that is hyperlinked to another webpage in another website (meaning that the another webpage is not in the collection of web pages constituting the website of the web page on which the graphic is displayed). When a user clicks on the graphic, the browser associated with the user's computer is directed to the another web page. Once the browser is directed, and the browser displays the another web page, the user is able to conclude the e-commerce transaction (i.e. purchase the advertised product).

A method according to the present invention enables an e-commerce transaction without redirecting the browser to another webpage, where the remainder of the e-commerce transaction may be conducted. That is, in a method according to the present invention the user's browser is not directed to another web page (i.e. a web page associated with another web site) and remains directed to the web page while an e-commerce transaction is conducted.

In a method according to the present invention, once the user selects an information object displayed on a web page, to which the browser is directed, the e-commerce transaction is conducted without redirecting the browser.

An information object may be a moving or a static electronic image and/or a textual object (e.g. a brand, a phrase containing a brand, etc.).

A system according to the present invention, is an E-Commerce technology platform (and application) that enables seamless E-Commerce transactions from any electronic publishing page (e.g. a branded Blog, a social media web page, a website, Email, etc.).

A system according to the present invention provides access to a Client Application Programming Interface ("API"), which can be installed within any electronic publishing page. Once a user accesses the electronic publishing page using a computer and its contents are displayed to the user by a monitor associated with the user's computer, the API will enable the user's (client's) computer to interface with a system according to the present invention so that the two systems can communicate with one another. Once the API is captured from a system according to the present invention and installed, E-commerce transactions may be conducted without redirecting the web browser to another web page of another web site, thereby adding E-commerce functionality directly to the electronic publishing page itself.

Thus, for example, as a user reads the content of an electronic publishing page (i.e. Blog article) the user can click an information object, which will lead to the display of an information window. The information window may include a plurality of product information sections each section providing information regarding a product and at least one action button associated with the product in the information section. The action button can be configured to lead the user through the steps that will conclude an E-commerce transaction.

The steps leading to the E-commerce transaction may include a registration step either directly or through a third party web site where the user is already registered (e.g. Facebook Connect, etc.).

Once a user is registered, the user may interact with the system to conduct an E-commerce transaction from any electronic publishing page that includes an information object.

A system according to the present invention can be implemented with any electronic publishing platform including electronic social networking services, blogs, web sites, Email etc.

Each information section may also display an action button, which when clicked by the user, enables the sharing of the information in the associated information section with members of the user's network in a number of convenient ways (via email, social networks, etc.). The members of the user's network will then also be able to conduct an E-commerce transaction in the same manner as the user.

Sellers of products can use a system according to the present invention to configure/customize information windows displayed to the users and direct the system to add E-commerce capability to designated electronic publishing pages.

Furthermore, a system according to the present invention can provide the following reports to a registered seller:

1. Daily, weekly, annual Sales of products
2. Sales by location
3. How many people shared information regarding the seller's content and where the information was shared
4. Referrers: A referrer is an electronic publishing page (e.g. a web page) at which at least the E-commerce transaction, which is concluded by or at least through a system according to the present invention, was initiated without the browser being directed to another electronic publishing page.
5. Demo and lifestyle information: This information is demographic and lifestyle information from consumers (users) captured and stored in a database by a system according to the present invention. Examples include spending tiers, content type, category type and any demographic/lifestyle information (age, sex, product interests, etc.,) and other information that can be appended through other databases.

A user/potential buyer experiences the following when interacting with a system according to the present invention:
1) On a particular web page, the user clicks on the information object and the system auto-detects if the user is a registered user.
2) If so, an information display window will be displayed to the user that displays one product information section or a plurality of information sections each displaying information regarding a respective product. Each information section provides the user with an option to add the product to a virtual shopping bag and/or to share the information regarding the product in that information section with the user's network via, for example, an electronic social networking service.
3) Once the user's selection is placed in the virtual shopping bag, optionally, other items are displayed to induce another sale (upselling).
4) Once the user confirms the intent to conclude the purchase, an additional discount to the purchase price or a free sample may be offered to the user if the user agrees to share information relating to the product through an electronic social networking service.
5) Thereafter, payment information is collected from the user and processed by the system to conclude the E-Commerce transaction. A receipt may be then emailed.
6) For a new user, personal information, credit card and shipping information are obtained after the user has directed the placement of a selected product in the virtual shopping bag.
7) A user may check out as a guess without registration with the system. Only credit card and shipping information are obtained in this case.
8) A discount may be applied to new users upon confirmation of the purchase.

A seller of a product may experience the following when using a system according to the present invention:
1) A new seller may first register with a system according to the present invention through a website associated with the system. To register the seller provides to the system preferably via the website its name, gateway information and account information.
2) The company's profile will be customized with its brand identity meaning that the creative, copy and other branding elements will be incorporated into the design of the page templates and rendered displayable within the information displays sequentially displayed to the user during the E-commerce transaction.
3) The seller will then be able to populate the system with seller's product information. The seller can choose various templates for presenting the product information in an information display window and may designate which template is used for which electronic publishing page.
4) The system then associates each template customized with the seller's products with the designated electronic publishing pages designated by the seller.

A system according to the second embodiment of the present invention integrates an intermediary platform with a seller platform or a plurality of seller platforms to at least: 1) conduct credit card payment on the seller platform hence following the seller's policies, and 2) submit the order into the seller's existing E-Commerce Orchestration hence leveraging the seller's order placement system which creates a sales transaction as well as a new/existing customer record into the seller's customer relation management system.

In a system or a method according to the present invention, a custom script (computer executable code) is provided so that an E-commerce transaction to acquire (e.g. buy) a product from a seller can be performed from a publisher's web page (e.g. a blog or the like) who is not associated with the seller of the product without redirecting the user to another web page from the publisher's page in order to acquire the product from the seller of the product.

The script so provided thus permits an integration of E-commerce capability to an online publisher's page that is not associated with the seller of a product, meaning that the online publisher is not the seller's on-line product sale system.

In a system or a method according to the present invention the script, for example, can be activated:
a) through inline text (for example, by clicking on a specific text box/object an overlay (window) opens to permit the user to see product information and add the product to an online cart to purchase the product through an E-commerce transaction);
b) through inline image (for example, by clicking on an image an overlay(window) opens and the user can see product information and add the product to an online cart to purchase the product through an E-commerce transaction); or
c) within an ad Engine.

That is, the script when activated opens a window in the publisher's page or over the publisher's page to initiate an E-commerce transaction, which can be followed by other windows to carry the transaction to conclusion without redirecting the user to another page to conduct the transaction.

Other features and advantages of the present invention will become apparent from the following description of the invention, which refers to the accompanying drawings.

BRIEF DESCRIPTION OF THE DRAWINGS

FIG. 12 illustrates information made available to a registered seller by a system according to the present invention.

FIG. 13 illustrates a fillable form presented by a system to a registered seller for the purpose of update or adding product information.

FIG. 14 illustrates a web page accessible by a registered user that can be used to customize a product display window for the seller's products.

FIG. 16 illustrates a web page accessible by a registered user that can be used to report activity to the registered seller.

FIG. 27 shows an example of a user interface displaying products selected from the search result page (FIG. 26) that includes action buttons for generation of embeddable code.

FIG. 28 shows an example of a page generated and displayed to the third party publisher after a code generation action button for a product is selected.

DETAILED DESCRIPTION

A system according to the present invention includes a central processing center (CPC) which is one computer (server) or a plurality of interconnected computers (servers) configured to provide the necessary computer executable instructions, computer executable code, and information to a user's computer or a seller's computer to realize the functionalities described herein. The CPC in a system according to the present invention is also configured to retain and process information received from a user's computer or a seller's computer.

A system according to the present invention will include a CPC that can be selectively connected to communicate with user computers, seller computers, and computers hosting electronic publishing pages via, for example, a publicly accessible computer network such as the Internet.

Figure 1:
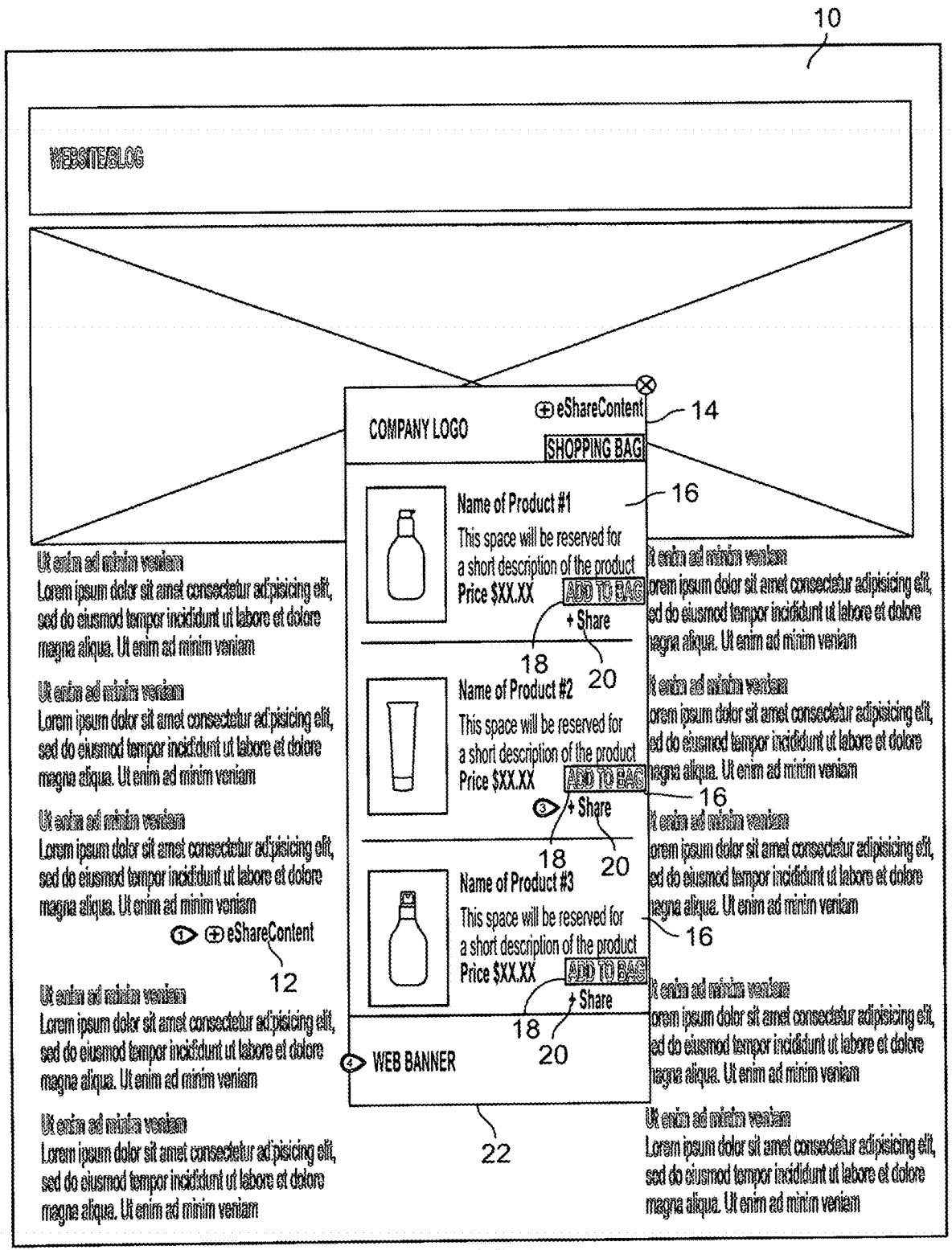
FIG. 1 illustrates a product display window generated and displayed over a web page according to a first embodiment of the present invention.

FIG. 1 depicts a web page 10 to which a browser on a user's computer is directed. Web page 10 is enabled to display an information object 12. After clicking information object 12 a product display window 14 is opened while web page 10 is still displayed behind product display window 14. Thus, the launching of the product display window 14 does not lead to the redirection of the browser from web page 10 to another web page associated with a different web site.

Product display window 14 may include one information section 16, or a plurality of information sections 16. Each information section 16 may display information relating to a product, for example, the name of the product, a description of the product, and its price.

Each information section 16 may further include one action button or a plurality of action buttons. Each action button, when clicked, sends a command to the user computer that is associated with the display on which web page 10 is displayed to cause the computer to perform a function (e.g. execute a set of computer executable codes).

Action button 18 in each information section 16 enables the user to add the selected product to a virtual shopping bag as is well known in the field. Thus, when the user clicks action button 18 in one information section 16, the user's computer executes a series of codes that leads to the addition of the product described in that information section to a virtual shopping bag.

Action button 20 in each information section 16 enables the user to share the information pertaining to the product listed in the information section with a group of users through an electronic social networking service (e.g. Facebook®) as is well known in the field. Thus, when the user clicks action button 20 in an information section 16, the user's computer executes a series of codes leading to the display of information relating to the product described in that information section to a web page of an electronic social networking service.

Window 14 may further include an advertising section 22 that can be used for displaying advertising graphic or the like.

In a preferred embodiment, the clicking of information object 12 triggers a coded AJAX script that launches window 14. Window 14 may be a javascript generated ModalBox, powered by a javascript framework. The product information sections 16 may be dynamically generated based on the instructions present in the AJAX script.

Action button 20 may also be an AJAX script that calls a list of electronic social networking services and bookmarking services through which the user can share pertinent information on the user's social or bookmarking accounts.

Advertising section 22 may call GIF, PNG or other compatible banner advertisements from advertising distribution servers. These will be periodically refreshed.

In the embodiment shown in FIG. 1, the information object 12 is available to the user within the section designated of web page 10 for the display of content (e.g. text).

Figure 2:
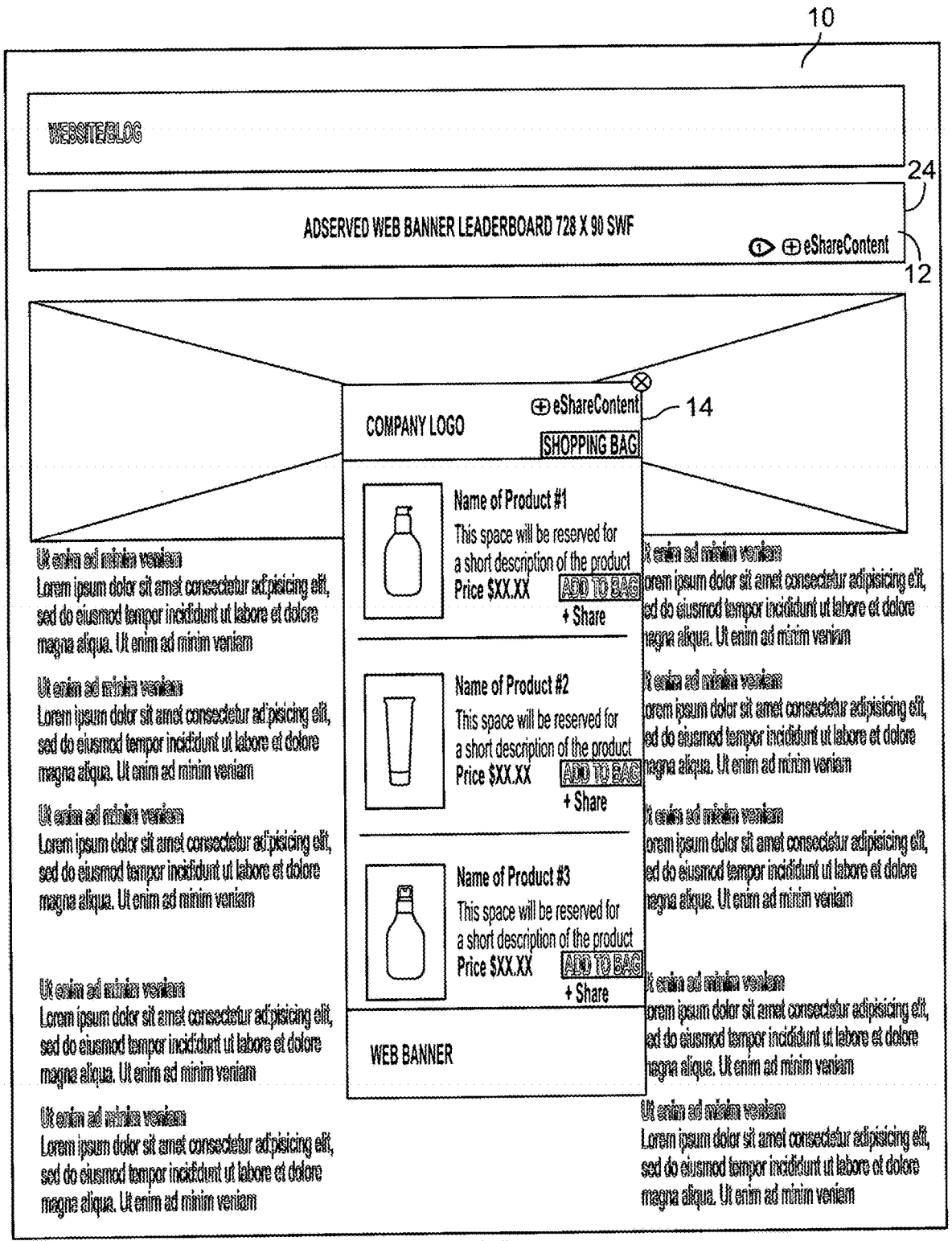
FIG. 2 illustrates the window shown in FIG. 1, generated according to a second embodiment of the present invention.

Referring to FIG. 2, in a second embodiment, information object 12 can be provided in association with a web banner 24 (e.g. a graphic) displayed along with the content of the web page.

Upon clicking information object 12, window 14 as shown in FIG. 1 is displayed by the browser for the user to view. Note that web page 10 remains displayed in the background behind window 14 since the browser is not redirected to another web page.

According to an aspect of the present invention, the computer associated with the user's display generates window 14 for display by the browser based on a series of computer executable codes (CEC), which have been configured and customized by the seller of the product. The CEC may be sent to the user's computer from the CPC when information object 12 is clicked and executed by the user's computer, or the CEC may reside on a different computer and executed by a computer other than the user's computer. The execution of the CEC enables at least communication between the CPC and the user's computer. While in communication the CPC and the user's computer may exchange computer executable instructions and information. The information supplied to and received by the CPC may be provided by the user via one or more graphic user interfaces which are generated based on code supplied by the CPC and displayed by the browser residing on the user's computer.

Note that information object 12 can be customized for any type of advertising banner. A SWF banner will contain an ActionScript button that calls ActionScript programming to generate a call to action to start the process, namely to generate the windows (e.g. pop-up windows) and fillable forms for conducting the transactions (e.g. E-Commerce transactions, registration etc.), whereas GIF/PNG/JPG banners call an appropriate JavaScript function to do the same as the SWF banner as described herein. Mobile compliant ad servers can substitute SWF banners when available so that information relating to the products can be viewed on non-Flash supporting mobile devices. The information object 12 may also be accessed from within web banners.

Figure 3:
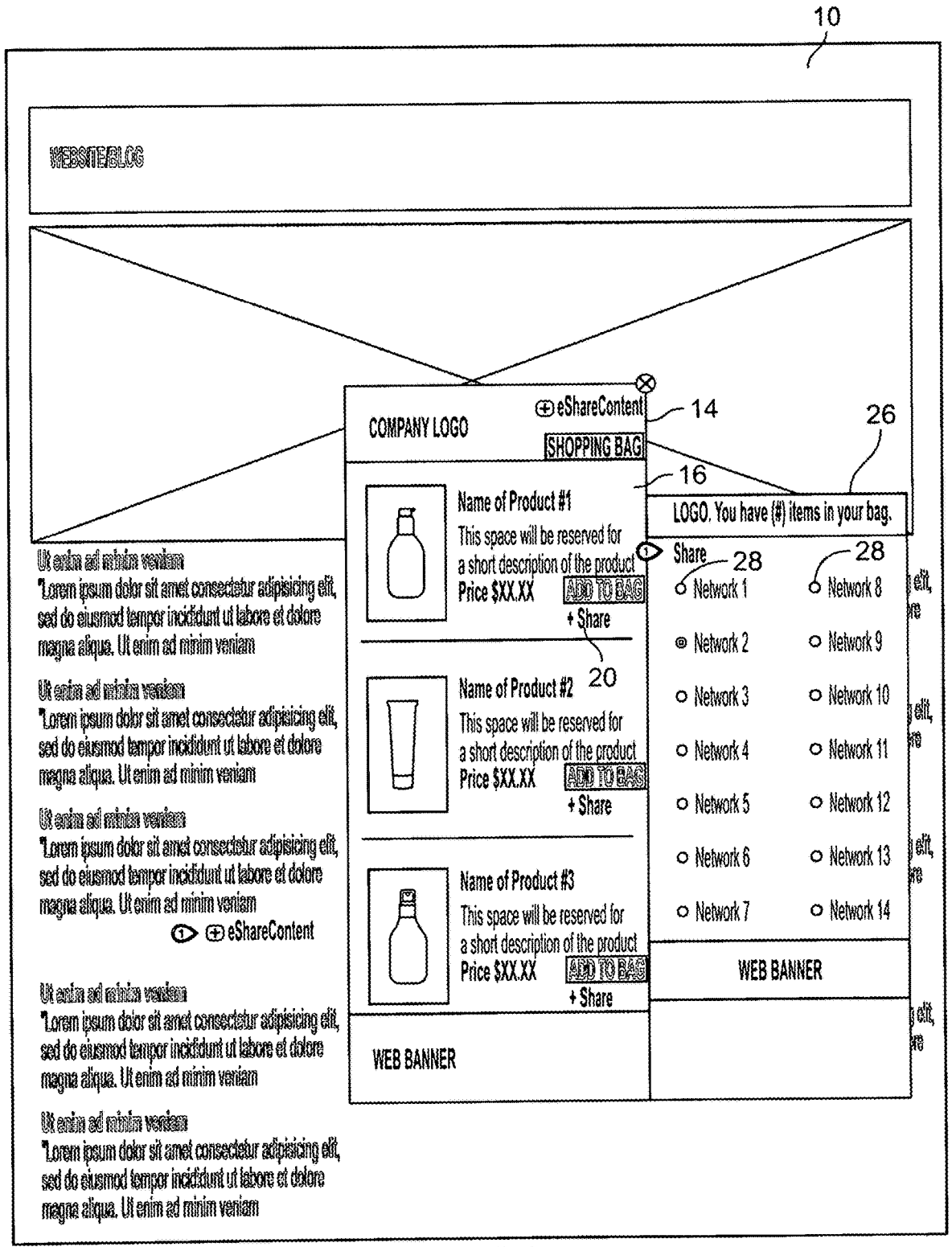
FIG. 3 illustrates a selection window generated in response to a user's clicking of an action button in the window shown in FIGS. 1 and 2.

Referring now to FIG. 3, once action button 20 is clicked by the user, a first electronically fillable form 26 is generated and displayed for the user by the user's browser. Form 26 includes a plurality of virtual buttons 28 each associated with an electronic social networking service. The user may select one electronic social networking service or two or more such services. The selection leads to the transmission of information related to the product associated with the display section 16 that is also associated with the clicked action button 20 to the selected social networking service.

Figure 4:
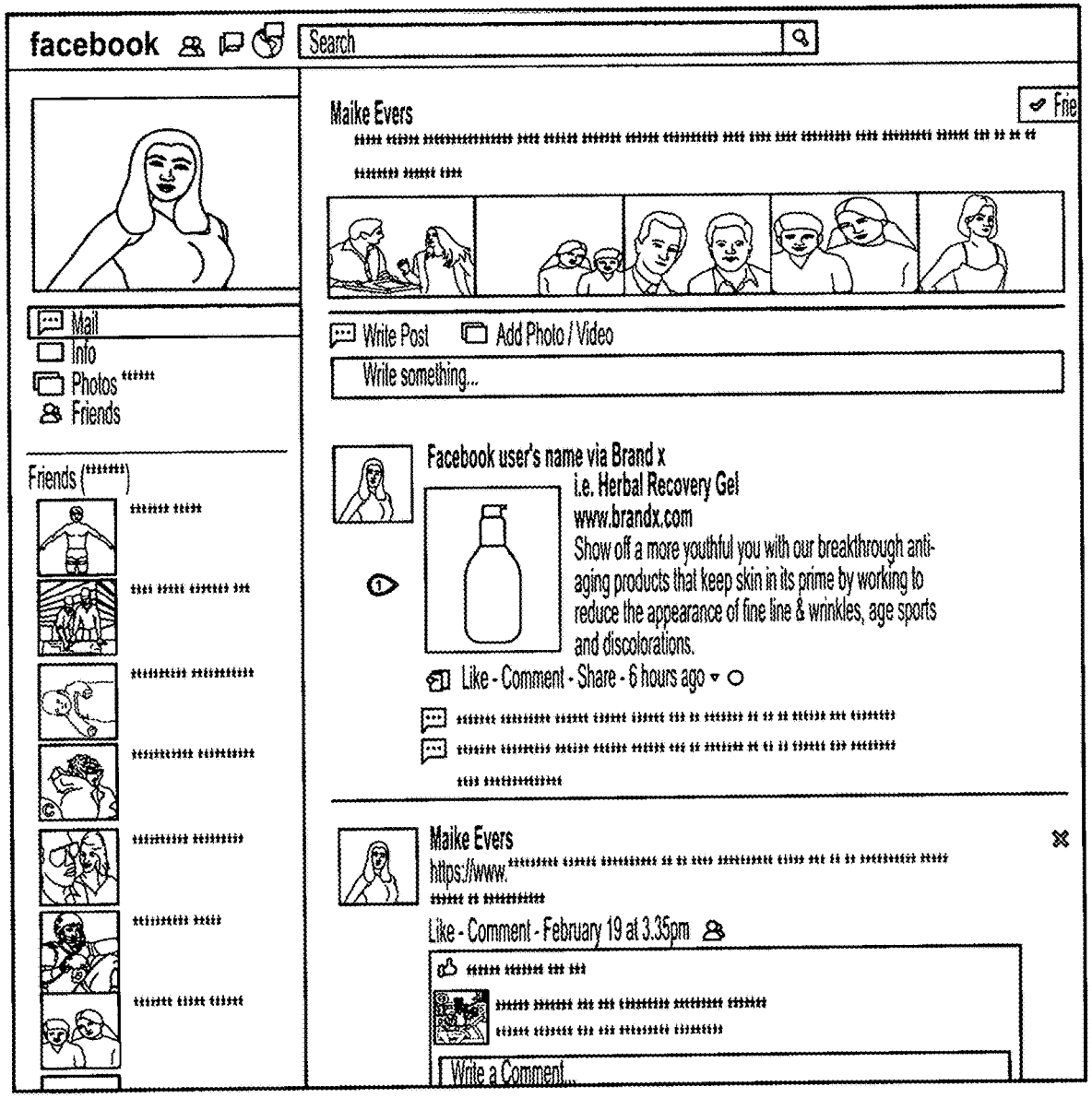
FIG. 4 illustrates a web page displaying product information in response to a user's selection from among the choices provided in the selection window shown in FIG. 3.

For example, as shown in FIG. 4, information relating to the item in information section 16 is then displayed on a web page of a selected electronic social networking service, in this case web page available through a well known service called Facebook.

Optionally, information regarding the product can also be shared on other people's walls, or tagged to specific people. Sharing, depending on the social networking services API, can either occur within the same page, or within a different browser tab or window. The shared information will then be displayed on the social networking services web site, which will open in a new tab or window.

Sharing is preferably handled by an API connected to a portal that lists available social networks and bookmarking services for media distribution. The user will have to be logged into his preferred networks, or will be prompted to log in before sharing.

Figure 5:
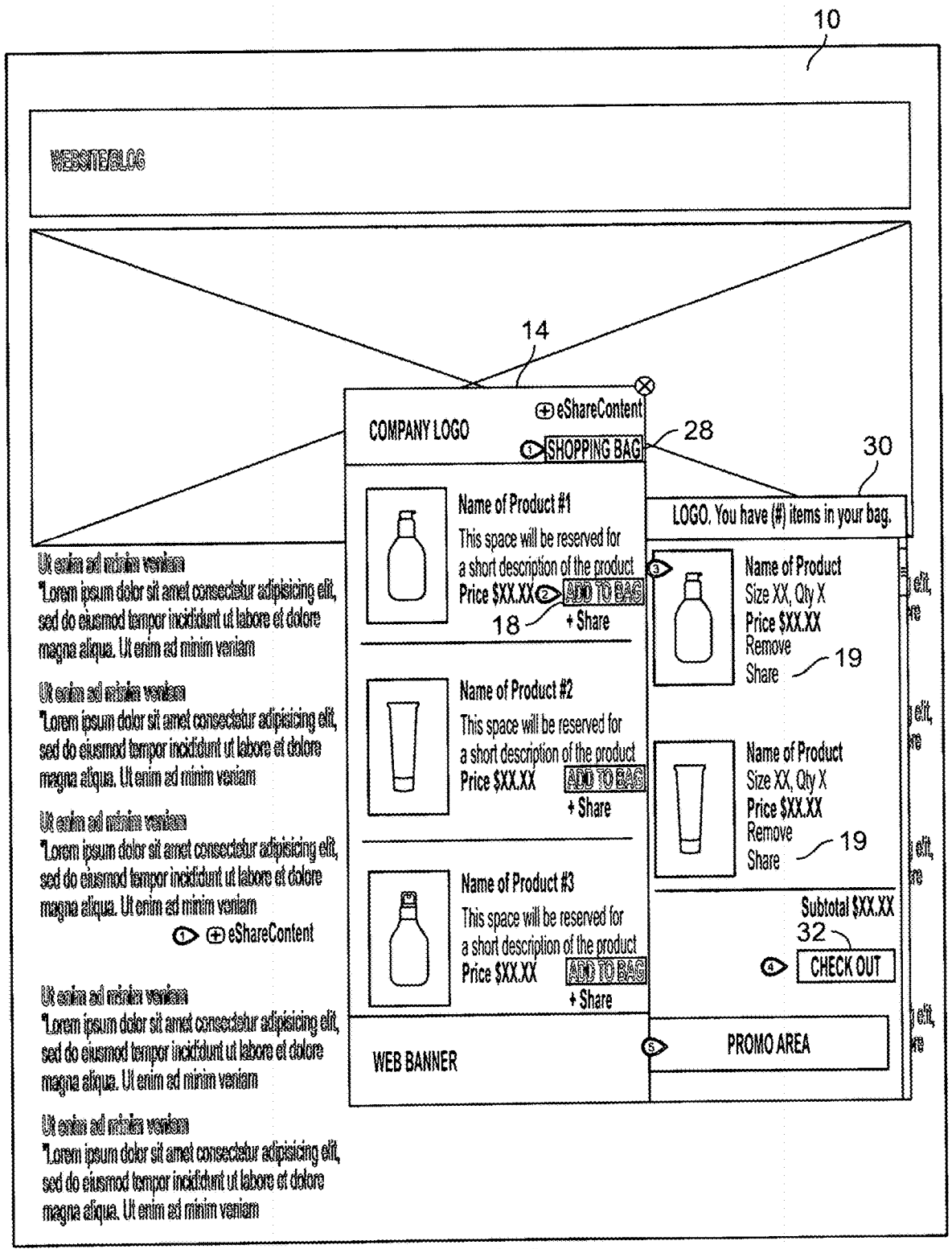
FIG. 5 illustrates a first check out window displaying product placed in a virtual shopping bag by the user.

Referring now to FIG. 5, window 14 further displays action button 28. When action button 28 is clicked by the user a first e-commerce window 30 is generated to display products placed in the virtual shopping bag.

Before any information is processed from the generated shopping bag listing (AJAX frontend script) to the CPC (backend), it undergoes an encryption process that securely transmits information such as the User ID, product list, prices, and other relevant information to the CPC, where it is decoded. The clicking of action button 18 stores a script within the user's browser cookies, remembering items marked, quantities, cost, and other relevant information. This script clears this information once the session is closed, either by javascript function, or when the browser is terminated. Products in the virtual Shopping bag are preferably described in terms of name, appearance (thumbnail), preferred size if applicable, quantity, and price. An additional action button 19 is also provided in window 30.

Figure 6:
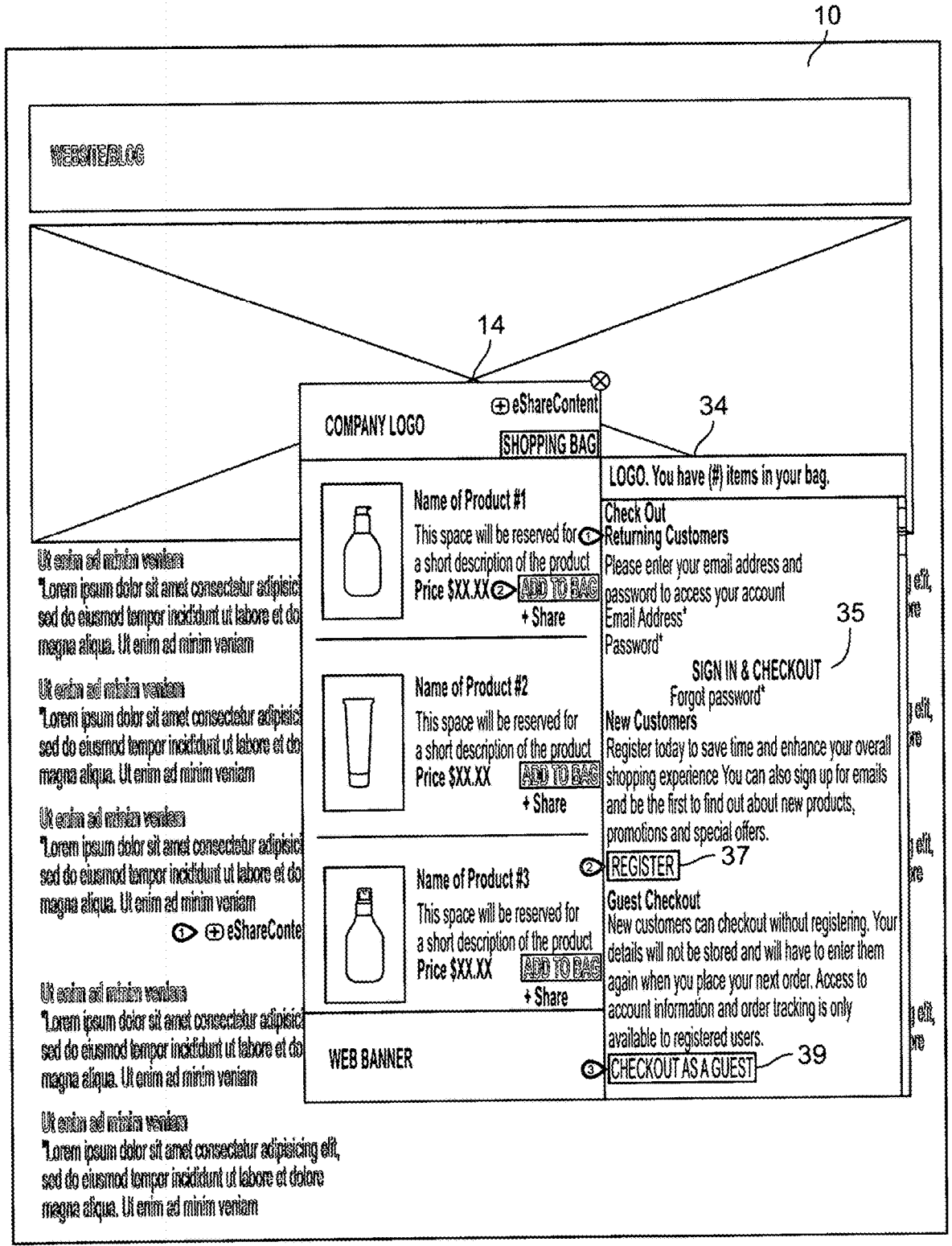
FIG. 6 illustrates a second check out window displaying different user categories.

Window 30 includes a check out button 32, which when clicked by the user, generates and displays a second e-commerce window 34 as shown in FIG. 6. Second e-commerce window 34 preferably allows the user to make one of three selections. Specifically, the user may select to further proceed with the e-commerce transaction as a returning customer 35 (i.e. a customer that has registered with the CPC), a new customer wishing to be registered 37 with the CPC, or a customer who wishes to continue without registering 39 with the CPC (a guest).

A guest can checkout without registering. The details of the transaction will not be stored in the CPC.

The system may provide access to account information and order tracking to registered users.

A system according to the present invention recognizes a registered user and generates a script based on the user's login credentials, which is then sent to the CPC (securely)

for processing. A cookie is generated, which will be available for the remainder of the user's session.

Figure 7:
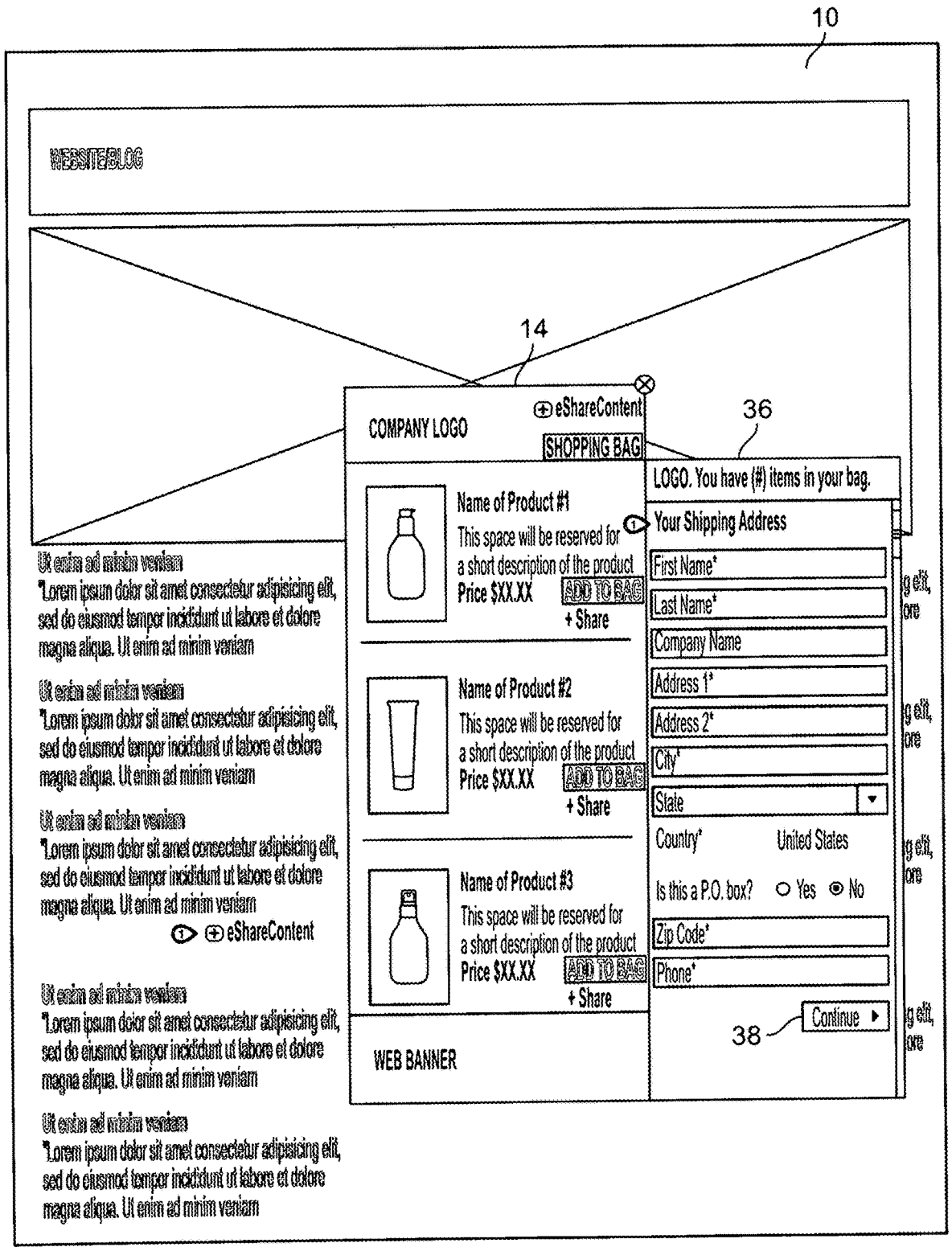
FIG. 7 illustrates a third check out window displaying a fillable form for obtaining shipping information from the user.

Upon selection of one of the options by the user, a third e-commerce window 36 is generated and displayed as shown in FIG. 7. Third e-commerce window 36 is an electronically fillable form that allows the user to enter his/her shipping address, telephone number, etc. The information so entered is then received by the CPC. Third e-commerce window 36 displays action button 38. Upon clicking action button 38, another e-commerce window is generated and displayed to collect payment information from the user. The payment information is then sent to and received by the CPC for payment processing to conclude the e-commerce transaction. A notification that includes a receipt for the transaction may be then optionally sent to the user electronically (e.g. via e-mail).

In the preferred embodiment, the electronic fillable forms are AJAX generated and are transmitted using a similar security algorithm used in conjunction with the virtual shopping bag uses. Form fields may be validated both using client-side and server-side scripts.

Figure 8:
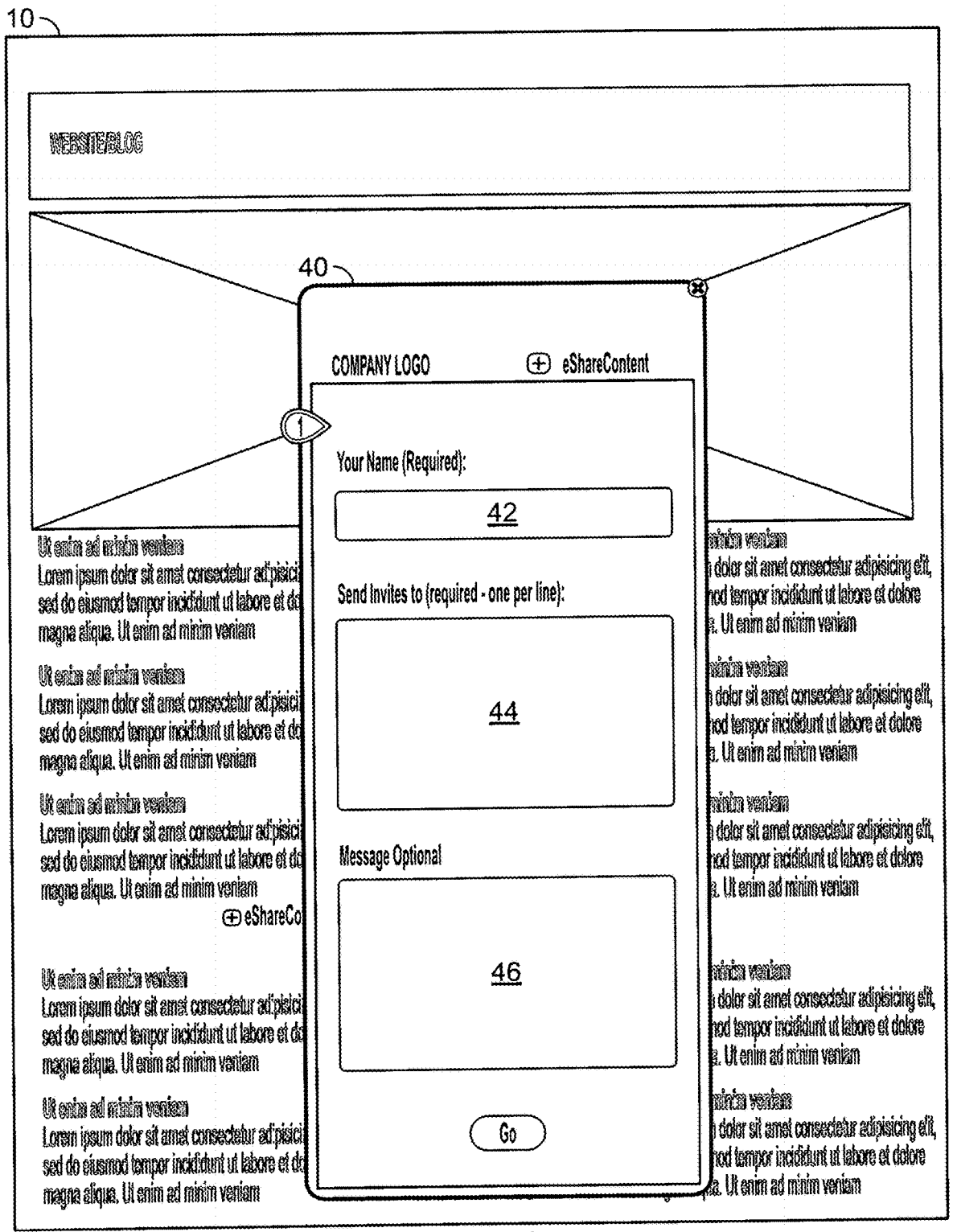
FIG. 8 illustrates a fillable form for obtaining information that is useful in sending out electronic invitations to a user's invitees.

Referring back to FIG. 6, if the user selects to register as a new user, as part of the registration process, the user may be enabled to send out electronic invitations to other users. FIG. 8 illustrates an electronically fillable form 40 that includes fillable field 42 in which the user may enter his/her name, a fillable field 44 in which the user can enter e-mail addresses of the invitees, and a fillable field 46 in which the user can enter a short message directed at the invitees.

Preferably, an SSL-enabled mailserver handles the distribution of email invitations, compliant with SpamAssassin and other anti-spam standards.

Figure 9:
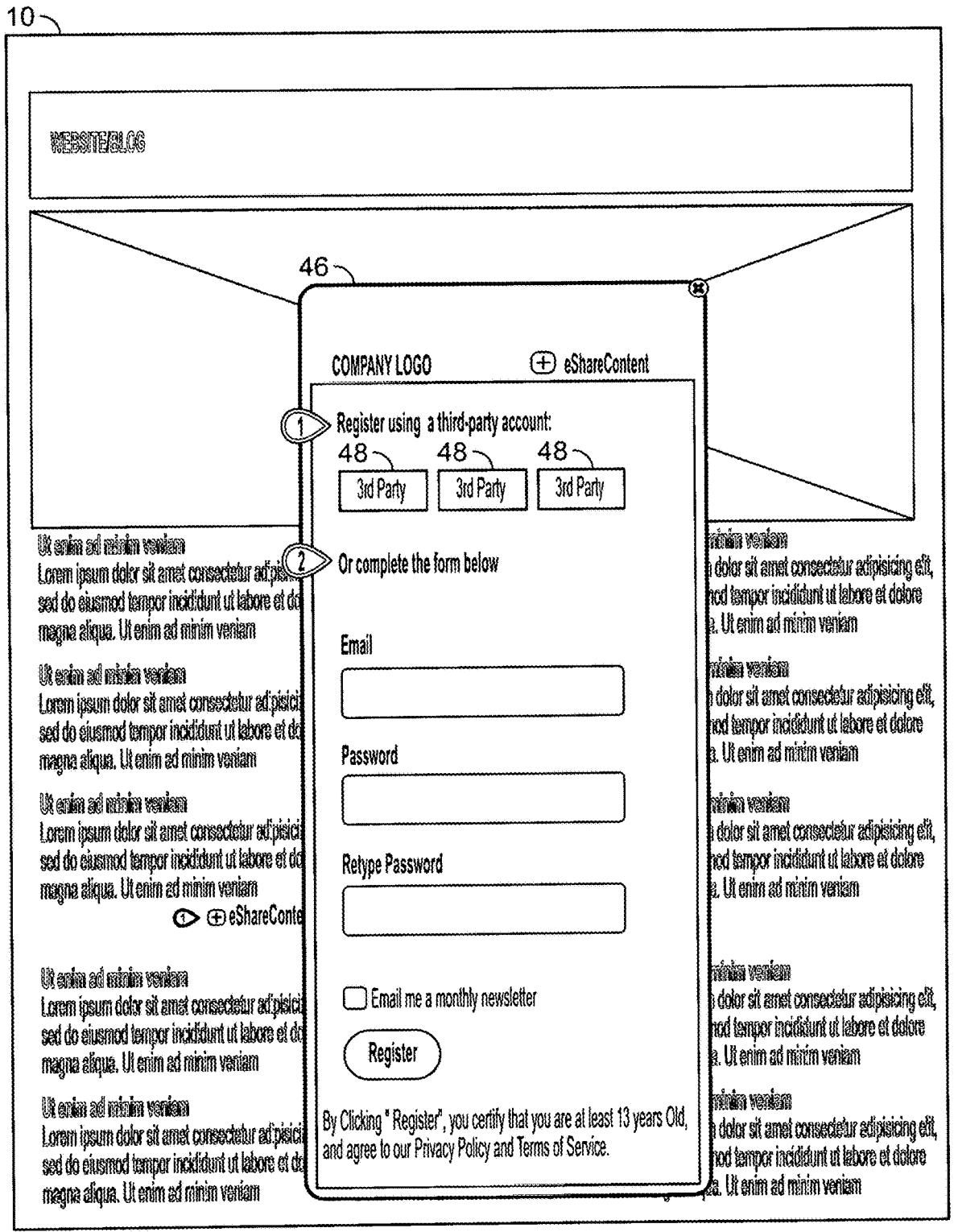
FIG. 9 illustrates a fillable form providing the user with options to automatically populate a registration form through a third party service.
Figure 10:
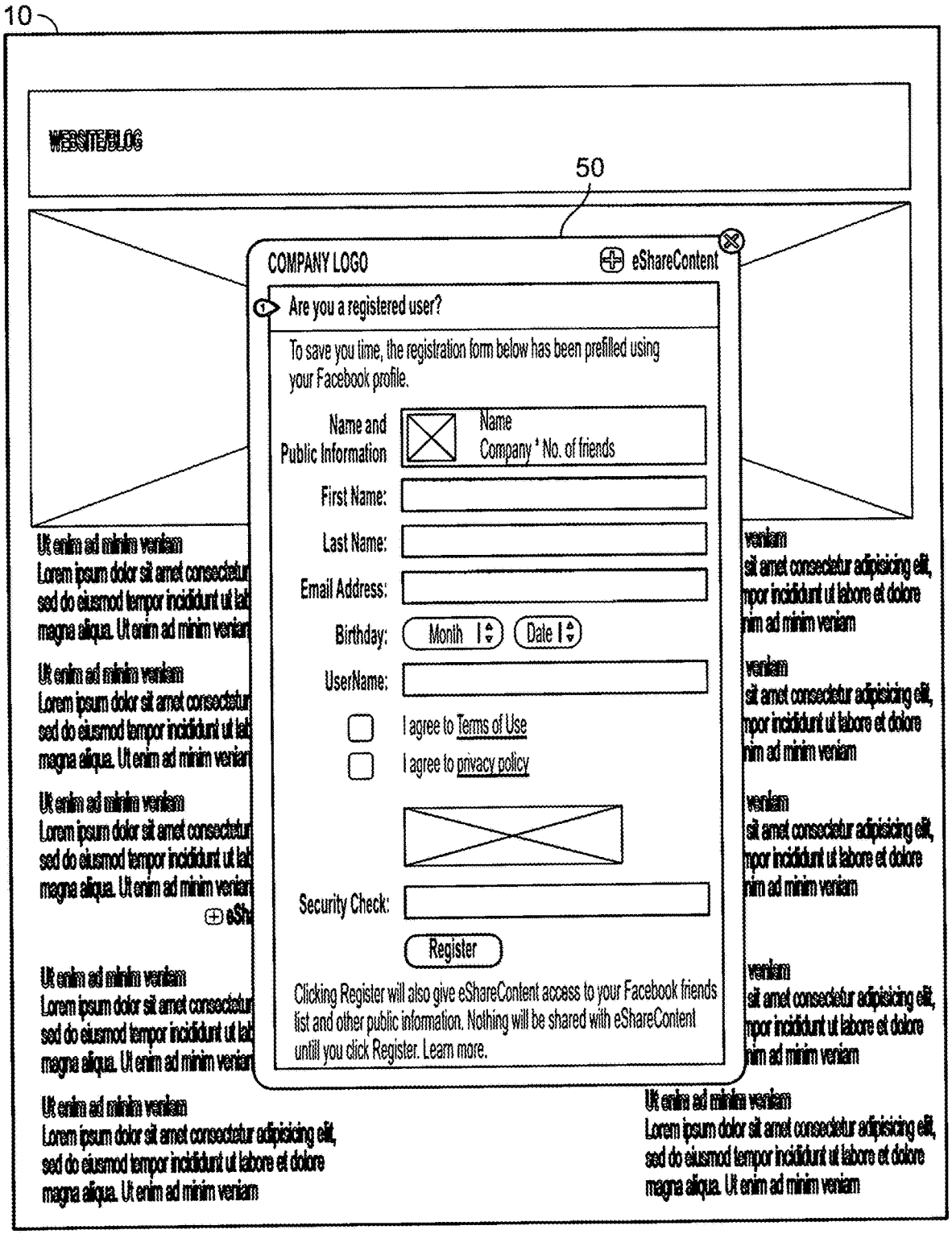
FIG. 10 illustrates a fillable registration form.

Referring now to FIG. 9, as an alternative, a new user may register through another registered account from a service provided by a third party web site (e.g. an electronic social networking service) other than a web site associated with the CPC. Thus, a window 46 may be optionally provided to the user that includes a plurality of action buttons 48 each associated with a third party social networking service with which the user has registered. By clicking any one of action buttons 48, the user's registration information is obtained from the third party social networking service. Thereafter, a registration window 50 is generated and displayed (see FIG. 10), and each field in registration window 50 is populated with the appropriate registration information obtained from the third party social networking service.

APIs for various third party social accounts will receive security tokens enabling interaction between the CPC and the third party network. A regular form submission process (secure encrypted) is also available. Newsletter requests will be handled by the system's mailserver for processing.

Note that, as is well known in the field, the information provided by the user is validated (at user's computer and at the CPC) and/or the user is directed to populate each field that is empty after the registration information is obtained from the third party social networking service.

Figure 11:
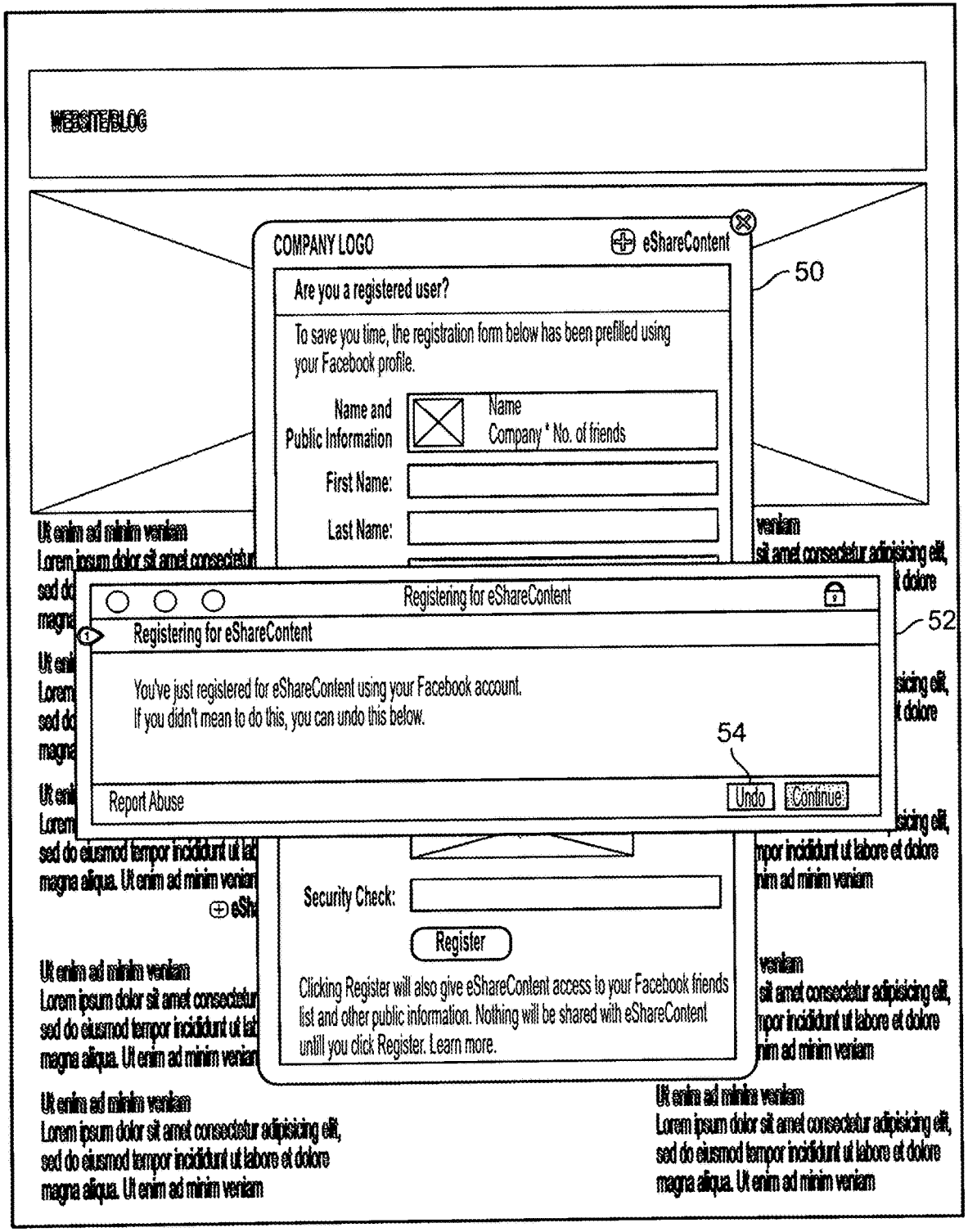
FIG. 11 illustrates a window that provides a user with the option to abort the registration process.

Referring to FIG. 11, optionally, a confirmation window 52 may be generated and displayed to the user by the user's browser that includes an undo action button 54. By clicking undo action button 54, the user can undo the registration in which case the CPC will delete the user's registration information.

Preferably, any action that aborts a process, closes a window, terminates the browser session, or otherwise discontinues the process of interacting with the system will trigger a cleanup script that clears all browser cookies generated by the system.

As is readily seen the user interacts with the CPC to conclude an e-commerce transaction and conduct other transactions without the user's web browser being directed to another web page.

A system according to the present invention enables a seller of each product displayed in a window 14 to configure a CEC to generate at least the code necessary for display of window 14 with the seller's product(s) by a user's web browser.

A system according to the present invention further enables a seller to designate a third party web site that will be displaying information object 12 on at least one of its web pages, the activation of which through clicking leads to an e-commerce transaction without leaving that web page of the third party web site.

In a system according to the present invention, each information section 16 is populated with information provided by a merchant/seller to the CPC. To provide product information to the CPC, a seller can set up an account with the CPC by first registering as a seller.

Once registered, a user can upload to the CPC information relating to a product or a number of products. The information so provided will be used by the CPC to enable the display of information window 14 (see e.g. FIG. 1) by a browser.

Figure 12:
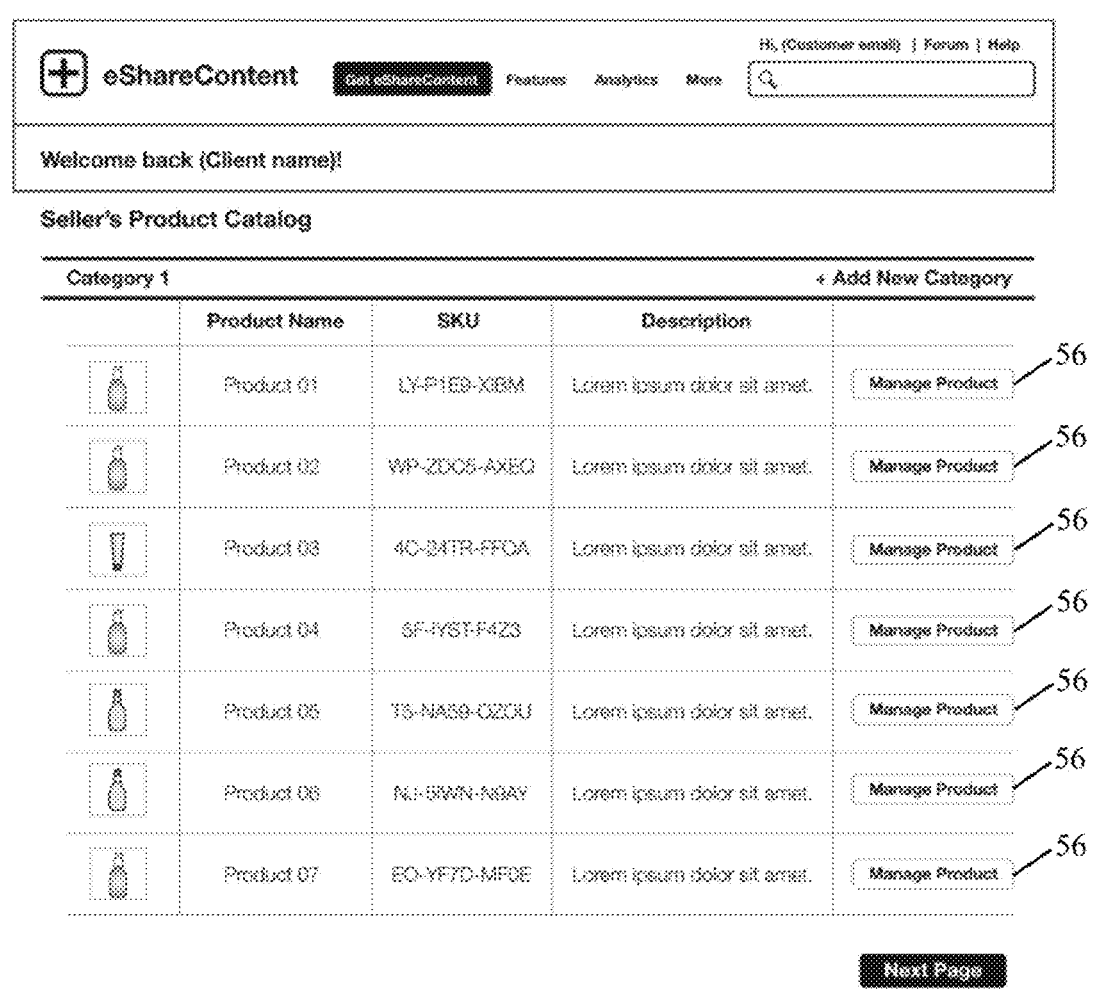

FIG. 12 shows a listing of a plurality of products associated with a registered seller. The CPC is configured to provide the information shown in FIG. 12 to a registered seller once the registered seller establishes communication with the CPC. The communication may be established through a website associated with the CPC that would enable the seller to send information to the CPC and obtain information from the CPC. The information shown in FIG. 12 may be displayed to a seller via a web browser residing at the seller's computer.

By clicking on Manage Product action button 56, a registered seller may edit the information related to the seller's product(s) through a number of customization web pages available from a web site associated with the CPC to a registered seller.

A register Seller can access a full list of products, and manage the information of one product or multiple products.

Figure 13:
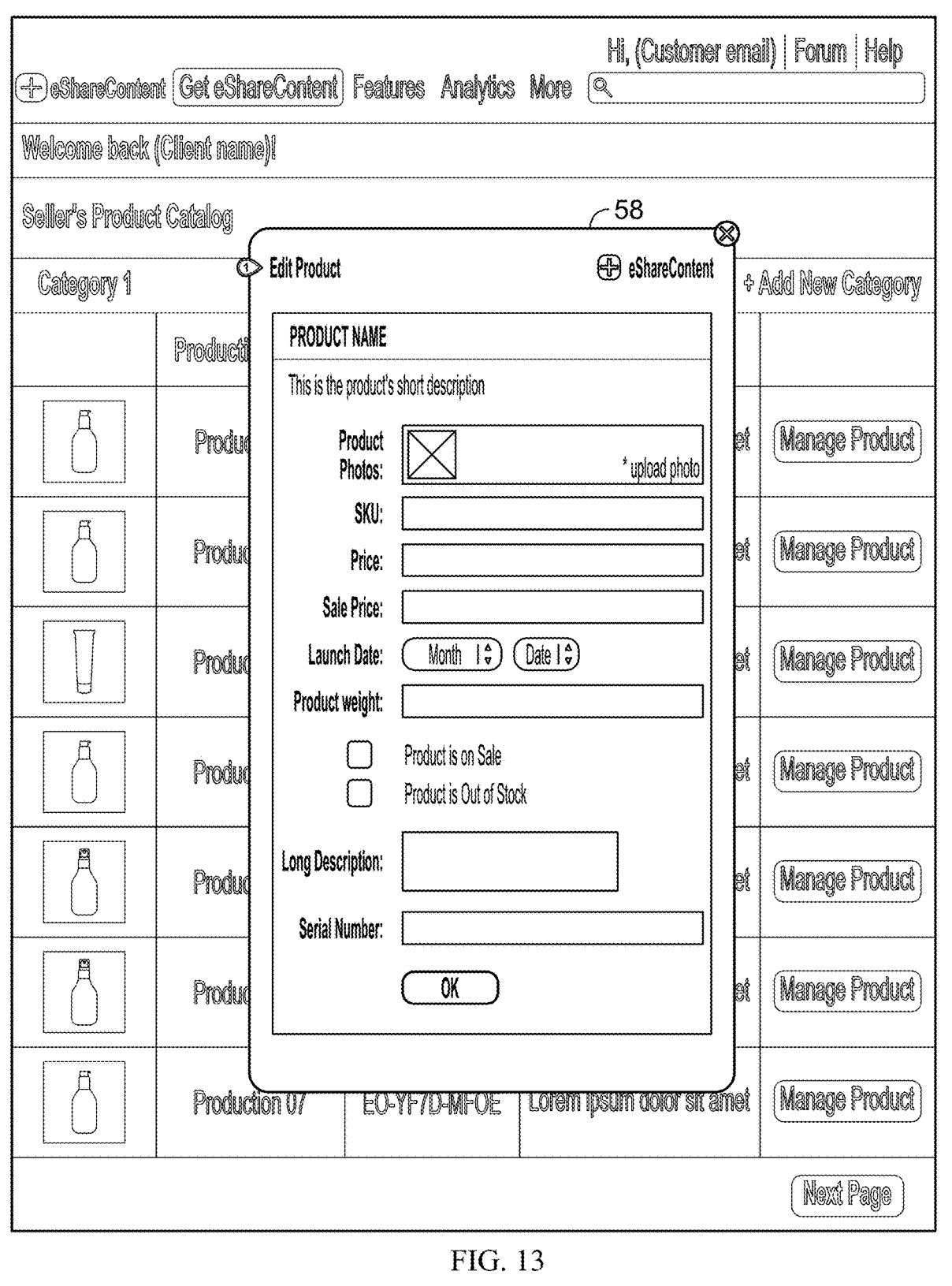

FIG. 13 shows a first customization and electronically fillable form 58 provided by the CPC through which a registered user can update the information related to a seller's product(s).

Figure 14:
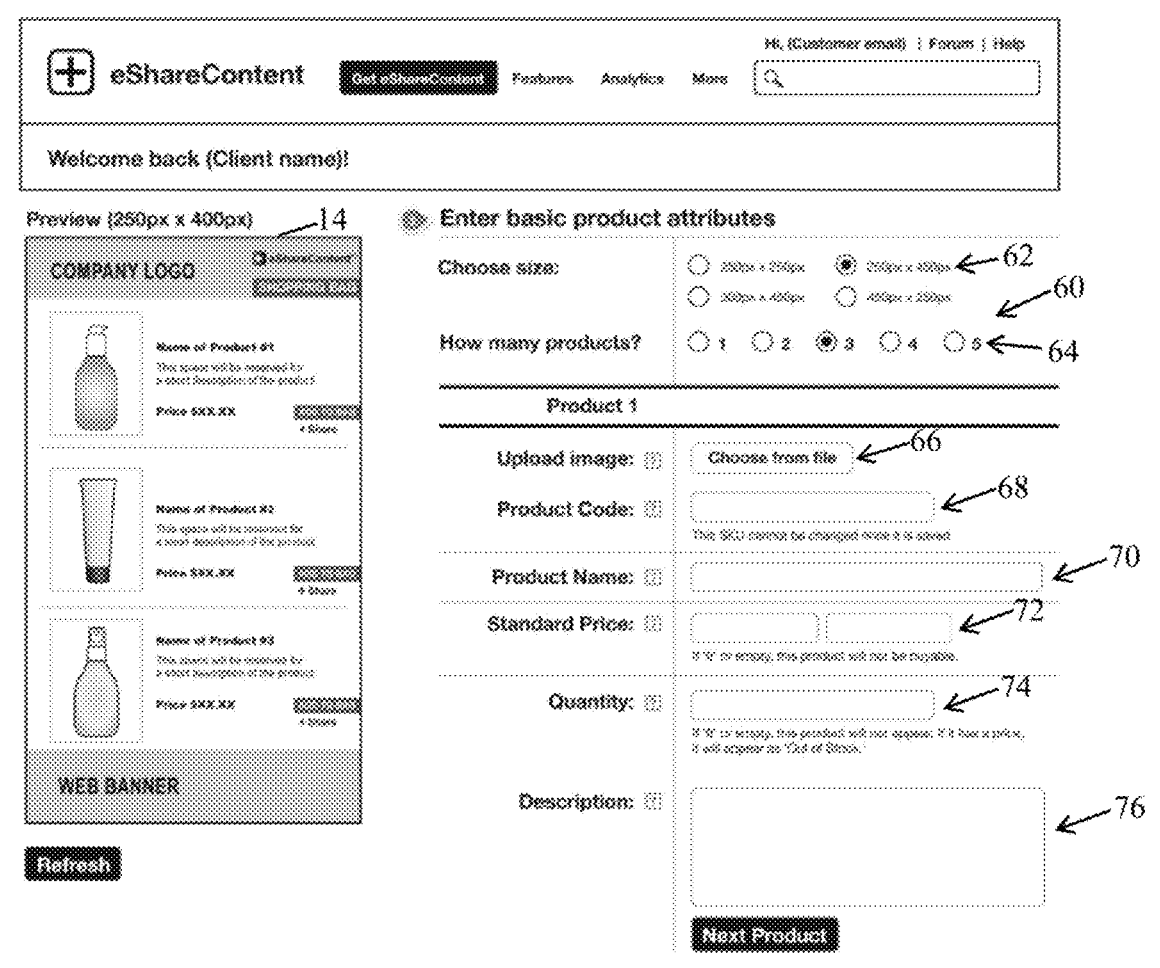

FIG. 14 shows a customization web page accessible by a registered seller configured to display to the seller an electronically fillable form 60 which can be used by a registered seller to devise a window 14 with multiple information sections 16. Form 60 includes a plurality of fillable fields that allow the registered seller to select the size of the window 62, select the number of displayed products 64, select and upload an image file for each product 66, enter a product code 68, enter a product name 70, enter a product price 72, enter the quantity of products available 74, and a description of the product 76. Based on the information CEC is devise by the CPC, which when executed will allow a browser to display a window 14 over a web page of a third party web site according to the seller's specifications and without redirecting the browser to another web site.

Preferably, a registered seller can generate and preview the look of its product display window 14.

While code snippets may be provided by the user, the CPC may parse information from a WYSIWYG editor that generates the code according to the user's instructions.

Figure 15:
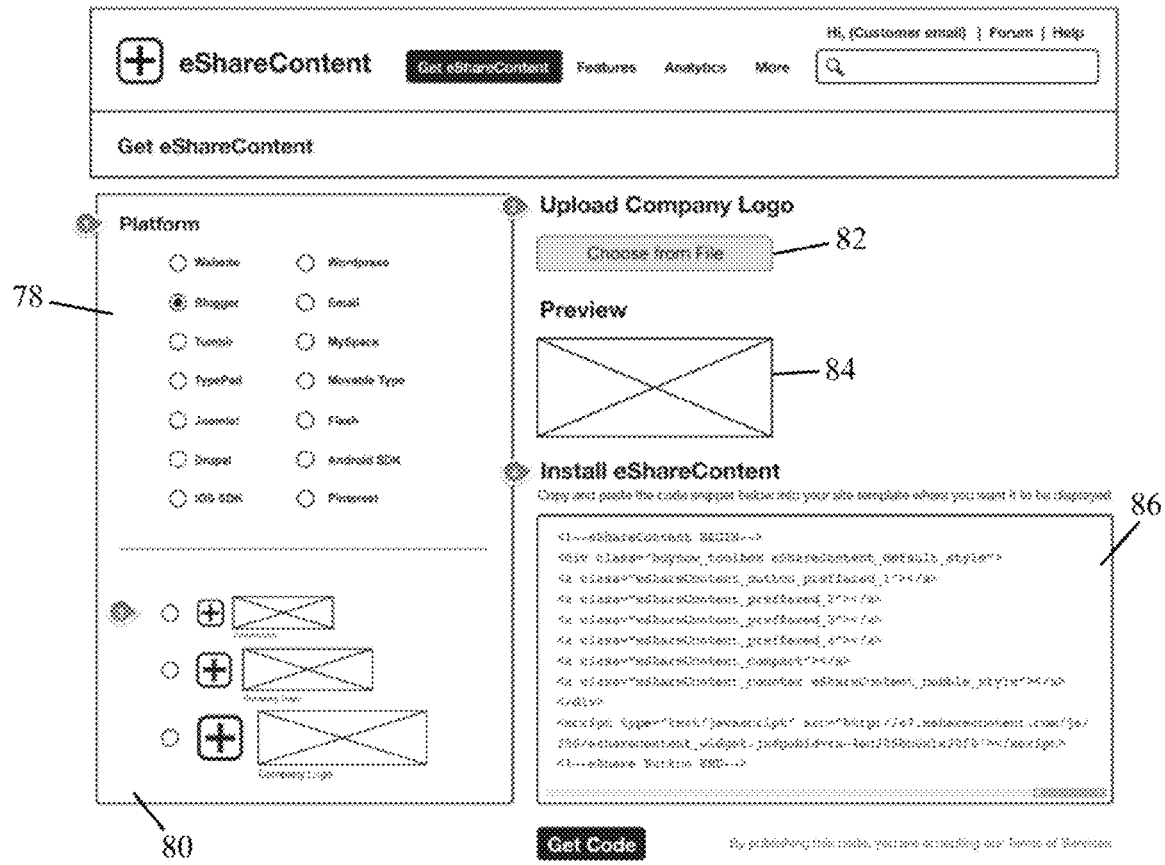
FIG. 15 illustrates a web page accessible by a registered user that can be used to customize other features by the registered seller including customization of each feature in view of a selected platform.

FIG. 15 shows another customization web page accessible by a registered seller. This customization page includes a platform selection section 78 with a number of platform selections each associated with a virtual button. The registered seller may select a platform or a number of platforms by clicking a radio button or buttons. Platform as used herein means an electronic content publishing service operable on a network of computers such as a website, a blog, an electronic social networking service, and so on. A code snippet or a link will be generated suitable for platform that is selected. These can be generated as straight code, as an href, iframe, or as a widget or module for a CMS platform. The code so generated will be displayed in display section 86. The code that is generated can then be copied and inserted into the code of the displaying page to enable the display of content (e.g. product information) and to enable E-Commerce functionality when applied to a webpage, mobile page, display banner, etc.

This page also includes a size selection section 80 that allows the registered user to select a size for a displayable feature, for example, the size of information object 12 or the registered seller's logo or brand.

The customization web page shown in FIG. 15 further includes an action button 82 the clicking of which will allow the registered seller to upload an image file (e.g. an image file for displaying the registered seller's logo). A window 84 is provided for the preview of the uploaded image file (branding mark).

Upload a branding mark will then generate a PNG button. The button can then be resized.

A registered seller can obtain information regarding the sale of its products from the CPC. FIG. 16 illustrates an example of a report which can be generated by the CPC and accessed by a registered seller.

The information may include an analysis of buttons' clickthrough rate, with color codes assigned to specific countries or Internet locations.

It should be noted that each action button contains tracking scripts, which then sends analytical information to the CPC. The information is then translated into visual graphs through AJAX functions.

Figure 17:
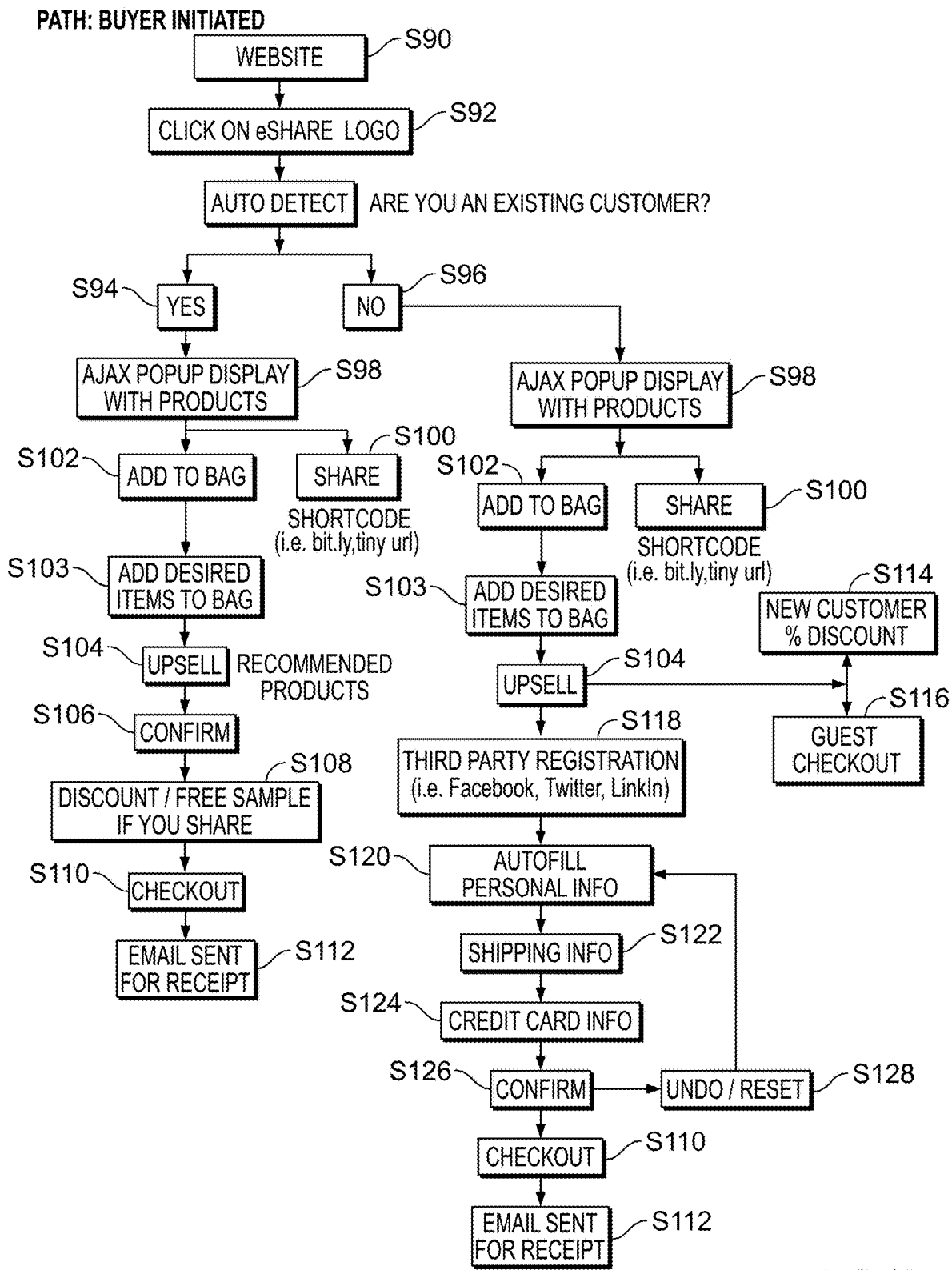
FIG. 17 is a flow chart summarizing user side interactions with a system according to the present invention.

FIG. 17 is a flow chart of the interactions of a user with the system. Once a user directs the browser to a website S90, information object 12 is displayed. Once user clicks an information object 12, S92, the CPC determines whether the user is a registered user S94, or an unregistered user S96. If it is determined that the user is a registered user, a display window 14 is displayed to the user S98. Thereafter, the CPC receives instructions regarding which action to take. If the user clicks action button 20, then the product information in the associated information section 16 is shared with the user's network S100.

If the user clicks action button 18, then the product is added to the virtual shopping bag S102. Optionally, at S103, user may be able to add multiple items to the virtual shopping bag. To enable this option, many items may be displayed with a check box associated with each item so that more than one item may be selected by the user before the next step. At this point, or after the user clicks action button 28 (See FIG. 5), the CPC cause the display of additional information relating to other products in order to induce an additional e-commerce sale/transaction S104, confirms that the user would like to proceed to conclude the e-commerce transaction S106, if the user has not clicked action button 20 associated with the product described in information section 16, offer discount or the like as an incentive to induce the user to click action button 20, S108, and then proceeds to conclude the e-commerce transaction by filing the user's personal information (shipping address etc.), payment information, and payment processing, S110. A confirmation notification in the form of an e-mail may be then sent to the user S112.

If the central processing unit determines that the user is unregistered steps S98, S100, S102 are repeated. At step S104, optionally a new customer discount S114 is offered to the user to induce the user to register as a customer. If the discount is accepted, the user follows a registration process as described above. If declined, the e-commerce transaction is concluded S116 by taking the user's personal information, the user's payment information, and payment processing.

At step S104, the user may elect to register through a third party registration (see FIG. 9 and associated description). If the user makes such an election, the instruction to obtain registration information from a third party is received by the CPC S118, and the user registration form 50 (FIG. 10) is automatically filled out S120. Thereafter, a shipping address for the user, S122, and the user's payment information S124 are obtained from the user. Thereafter, the user is offered the option to confirm the registration S126. If confirmed, e-commerce transaction is concluded S110. If declined, the registration process is reversed S128. Once the e-commerce transaction is concluded a notification (e.g. an e-mail) that may include a receipt is sent to the user S112.

Figure 18:
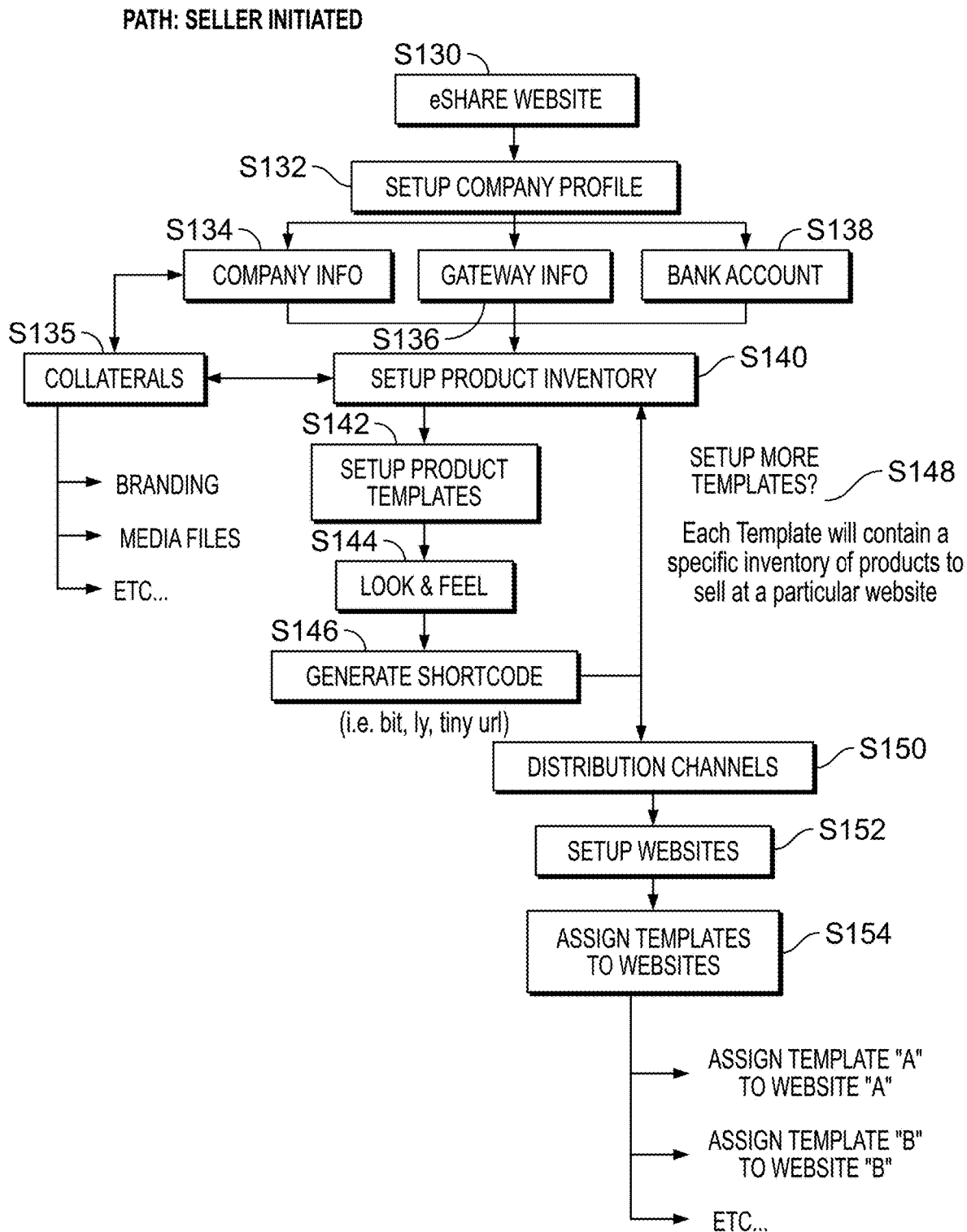
FIG. 18 is a flow chart summarizing seller side interactions with a system according to the present invention.

FIG. 18 is a flow chart illustrating a new seller's interactions with the system. To interact with the system, a new seller first directs a browser to a website S130 associated with the CPC. New seller then enters (and the CPC receives) the seller's company information S134 such as company name, company address, company telephone number, etc; the new seller's gateway information S136; and the new seller's bank account information S138. After entering company information collaterals or brand assets may be uploaded by a seller S135. The brand assets may include imagery, copy, video or any other content that seller may use as branding information. The information so uploaded may be selectively used by the seller to configure content for display to a user as further explained below.

Thereafter, the new seller becomes registered and as a registered seller may set up an inventory of products S140, configure a template for one product or a group of products S142, and select the cosmetic aspects of window display 14, S144. Thereafter, based on the seller's selections, the CPC generates the CEC S146.

The registered seller may have the option of setting up more product templates S148, in which case the system directs the seller back to S140. If the seller selects not to devise more templates, the seller selects distribution channels S150, designates websites or other electronic publishing pages which will be authorized to receive the CEC to enable an e-commerce transaction according to the present invention S152, and assign a different template to each one of the selected websites S154.

Figure 19:
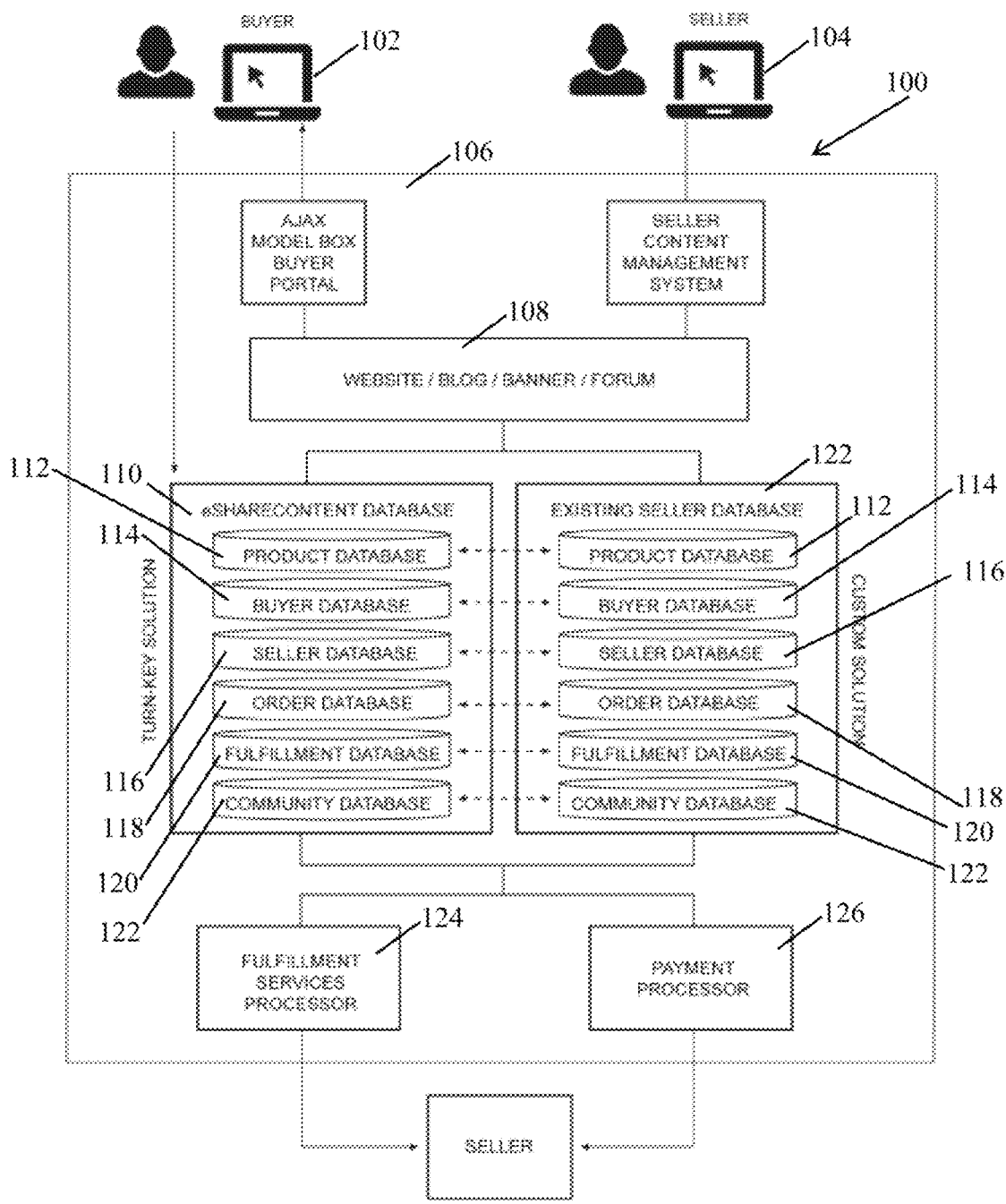
FIG. 19 schematically illustrates a system according to the present invention including the typical elements that a system according to the present invention and a product seller's platform may need to interface with one another to validate payment and to transmit an order to the seller's fulfillment center for shipping the product(s).

FIG. 19 schematically illustrates a system 100 suitable for the implementation of a method according to the present invention. System 100 includes a plurality of computing devices, e.g. PC's, tablets, etc. that are in communication with one another. Specifically, system 100 includes at least one user computing device (UCD) 102, a seller computing device (SCD) 104, and a content management system (CMS) 106. CMS 106 includes at least one or more servers 108 that host a plurality of websites, blogs and the like online information publishing sites each displaying an information object 12. Servers 108 are in operative communication with a CPC 110 which supplies the CEC for the display of window 14, and other graphic user interfaces for conducting an e-commerce transaction and other transactions disclosed above. CPC 110 may include one server or a plurality of servers that host a plurality of databases including a sellers' product database 112, a buyers' information database (registration information etc.) 114, a sellers' information database 116, an order database 18 containing buyer's order information, fulfillment database 120 containing information relating to buyer orders that have been fulfilled and a community database 122 Community database 122 will store the demographic and lifestyle information related to the registered users. The information contained in the community database may enable the system to recognize the registered users and enable the registered users to login and interact with the system from any electronic publishing page. Moreover, the registered sellers will be able to obtain market related information such as conversion rates to sales from different electronic publishing pages based on the information stored in community database 122.

As an option, a seller may operate a CPC 122 that includes databases storing information that can be found in the databases of CPC 110. Thus, a seller's CPC 122 may be configured to interact with CPC 110 in order to update its databases and/or update the databases of CPC 110.

It should be noted that all information supplied to and taken from the user's computer passes through CPC 110.

CMS 106 further includes a server or a plurality of servers that function to perform fulfillment services 124. Fulfillment services would include post-sale services such as e-mails or the like notifications regarding shipping of the item, tracking of the item while en route, and other electronic notifications and communications such as communications relating to returns or the like. In addition, CMS 106 would include a server or a plurality of servers that process payments to the seller 126 after e-commerce transactions are concluded.

A registered Seller utilizes CPC 110 to create and generate action buttons, which are then populated into a website, embedded into a banner, or associated with any other electronic publishing page.

Thus, in one embodiment, the E-commerce transaction is processed as a standalone e-commerce system in which seller product information resides solely on the system's CPC 110.

In another embodiment, the seller's existing database(s) can be synchronized with CPC 110 and the payment gateway of a system according to the present invention in order to securely transact and accomplish a purchase through the system. Thus, for example, as part of the transaction, CPC 110 may check the inventory records of the seller's inventory database before the transaction is concluded.

A payment gateway provides an additional layer of security, which is particularly important since a method according to the present invention involves purchase of products and transaction of payment information outside of an actual e-commerce environment, e.g. through an AJAX window of another website.

Figure 20:
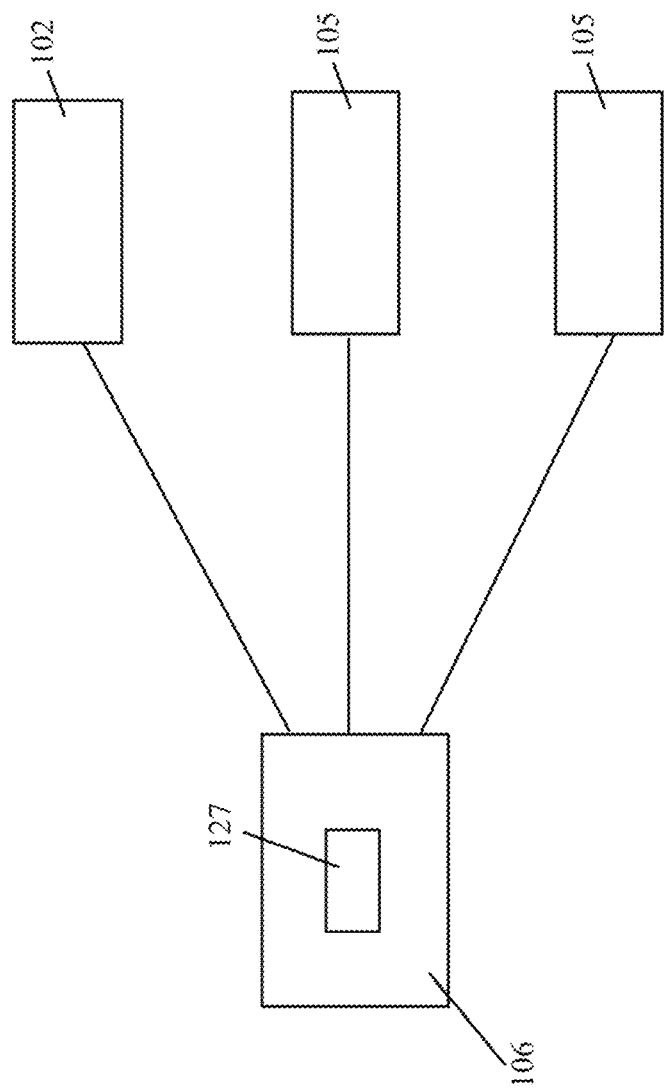
FIG. 20 illustrates an e-commerce transaction scheme according to one embodiment of the present invention.

Referring to FIG. 20, in one embodiment, CMS 106 will receive payment information (e.g. credit card information) from buyer's device 102 and will process the payment information in a secure manner on behalf of the seller in a settlement processor 127. The settlement processor 127 may be a server or a collection of servers configured to process payment based on payment information received from a buyer's computer 102. Thus, for example, either the payment gateway of CMS 106 can be used, or seller's payment gateway can be used to process the payment. Preferably, as a default, the seller's payment gateway may be used to process the payment.

Settlement processor 127 will confirm that the payment for the order received from buyer's device 102 is approved. Thereafter, CMS 106 may send an indication of the payment approval along with other order information to seller's system 105. For example, CMS 106 may send the order information (e.g. the selected by the buyer product, quantity of the product ordered and the like), and the buyer's information (e-mail address, mailing address etc.) to seller's system 105. Seller's system 105 may then check to determine whether the order can be accepted. For example, seller's system may check to determine whether the product is available and/or the number of product ordered by the buyer is available. If the order can be accepted, seller's system 105 will send a message to CMS 106 indicating the approval of the order, and will proceed to prepare for the shipment of ordered item or items to the buyer's mailing address. Upon receipt of an approval message from seller's system 105, CMS 106 will send a message to buyer's computer 102 indicating the order has been accepted. Thereafter, either the seller's system 105 or CMS 106 may send after-sale messages to buyer's e-mail address. For example, once the ordered item is shipped, a message may be sent to the buyer's e-mail address. Preferably, as part of the transaction, the entire details of the order including the buyer's information is sent to the seller's system.

If seller's system 105 cannot accept the order (e.g. if the product is not available), seller's system 105 will send a message to CMS 106 indicating that the order cannot be accepted. CMS 106 will then send a message to buyer's computer 102 to inform the buyer that the order has not been accepted, preferably, with an explanation for the rejection of the order.

Seller's system 105 may decline to process the order for other reasons. For example, the order may be declined if the credit card is declined, if the credit card information is incorrect, or if the buyer's address is incorrect.

Figure 21:
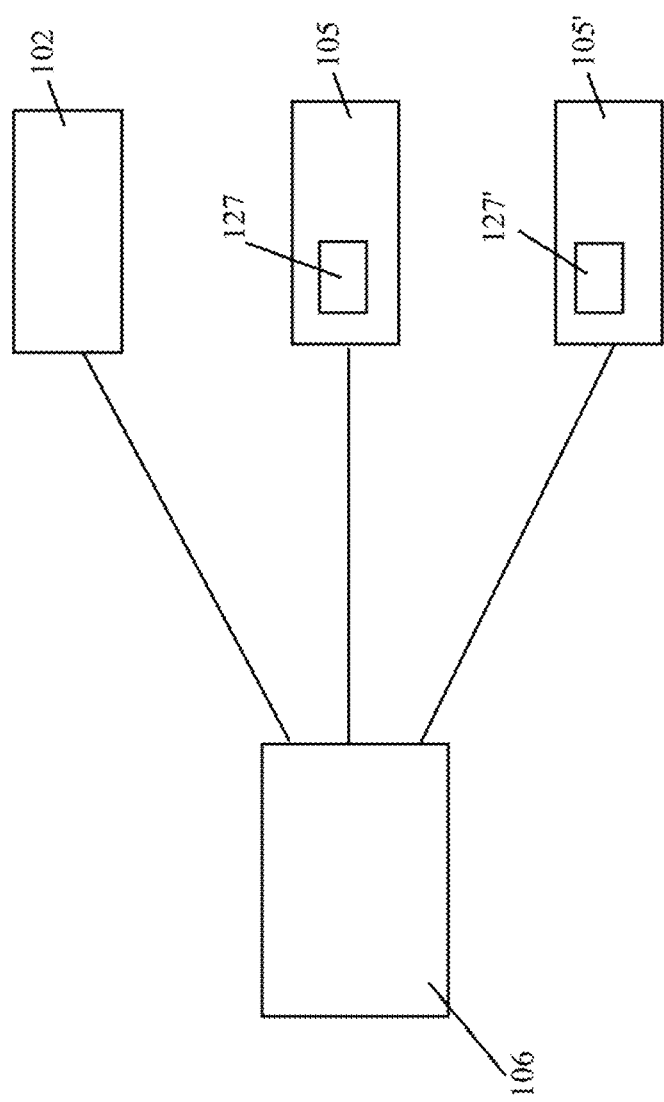
FIG. 21 illustrates another e-commerce transaction scheme according to another embodiment of the present invention.

Referring to FIG. 21, in an alternative embodiment, CMS 106 will not have a settlement processor 127 to confirm approval of payment based on information received from buyer's device 102. Rather, CMS 106 will pass, in a secured manner, the payment information, the order information, and the buyer's information to a seller's system 105. In this embodiment, the receiving seller's system 105 will have a settlement processor 127 to confirm approval of the payment. If approval of payment is confirmed, seller's system 105 will determine if the order can be accepted in the same manner as the previously described embodiment. If the order can be accepted, a message will be sent to CMS 106 that the order is accepted. CMS 106 will then send a message to buyer's computer 102 indicating that the order has been accepted. If the order cannot be accepted, system 105 will send a message to CMS 106 indicating that the order cannot be accepted. CMS 106 will then send a message to buyer's computer 102 indicating that the order has not been accepted. Thereafter, either the seller's system 105 or CMS 106 may send after-sale messages to buyer's e-mail address. For example, once the ordered item is shipped, a message may be sent to the buyer's e-mail address.

In the embodiments of FIG. 20 and FIG. 21, after-sale activity will be, preferably conducted by the seller through, for example, the seller's system. Thus, customer service related services, exchanges, returns and so on will be conducted between the buyer and the seller without participation of CMS 106. That is, CMS 106 will be an intermediary in these embodiments to generate sales, but will not further participate in any post-sale activity after informing the buyer that the order has been accepted.

In the embodiment shown in FIG. 21, CMS 106 may be provided with an API to enable CMS 106 to communicate with seller's system 105, which may be based on a software platform different than the software platform of CMS 106. In this embodiment, CMS 106 may be further provided with another API to enable CMS 106 to communicate with another seller's system 105', which may be based on a software platform different than the software platform of seller's system 105 and the software platform of CMS 106. Another seller's system 105' may have a settlement processor 127' that performs the same function as settlement processor 127.

In the embodiment disclosed in FIG. 21, the payment settlement facility as well as other facilities (e.g. inventory control, databases etc.) of the seller's systems 105, 105' are leveraged, thereby eliminating the need to maintain two independent e-commerce systems (one at CMS 106 and one at the seller's system 105) for the purposes of selling the same product and/or service. In this manner, only one system will perform inventory control, inventory checking, up-to-date pricing and so on, thereby eliminating the need to ensure that the two systems (CMS 106 and seller's system 105) have the same product related information (e.g. inventory, price etc.) at all times.

In addition, a system according to the present invention is not limited to the sale of products that need to be shipped to a mailing address. A system according to the present invention may be used to sell subscription to online publications. The embodiment of FIG. 21 is in particular suited for sales of subscriptions to online publications because the complex pricing of online subscriptions would make it extraordinarily difficult to maintain two independent e-commerce systems, one operated at CMS 106 and one operated as a seller's system 105 by a subscription seller.

Seller's system as used herein refers to an e-commerce system including one or more computers configured through appropriate programming to perform transactions over the Internet. Settlement processor as used herein is a computer or a plurality of computers configured through programming to obtain payment approval (e.g. credit card payment approval) over the Internet. The settlement processor may also be configured to perform:

Address Verification
Fraud Check
Shipping cost calculation
Tax Cost calculation
The pre-authorization on the payment method.

Figure 22:
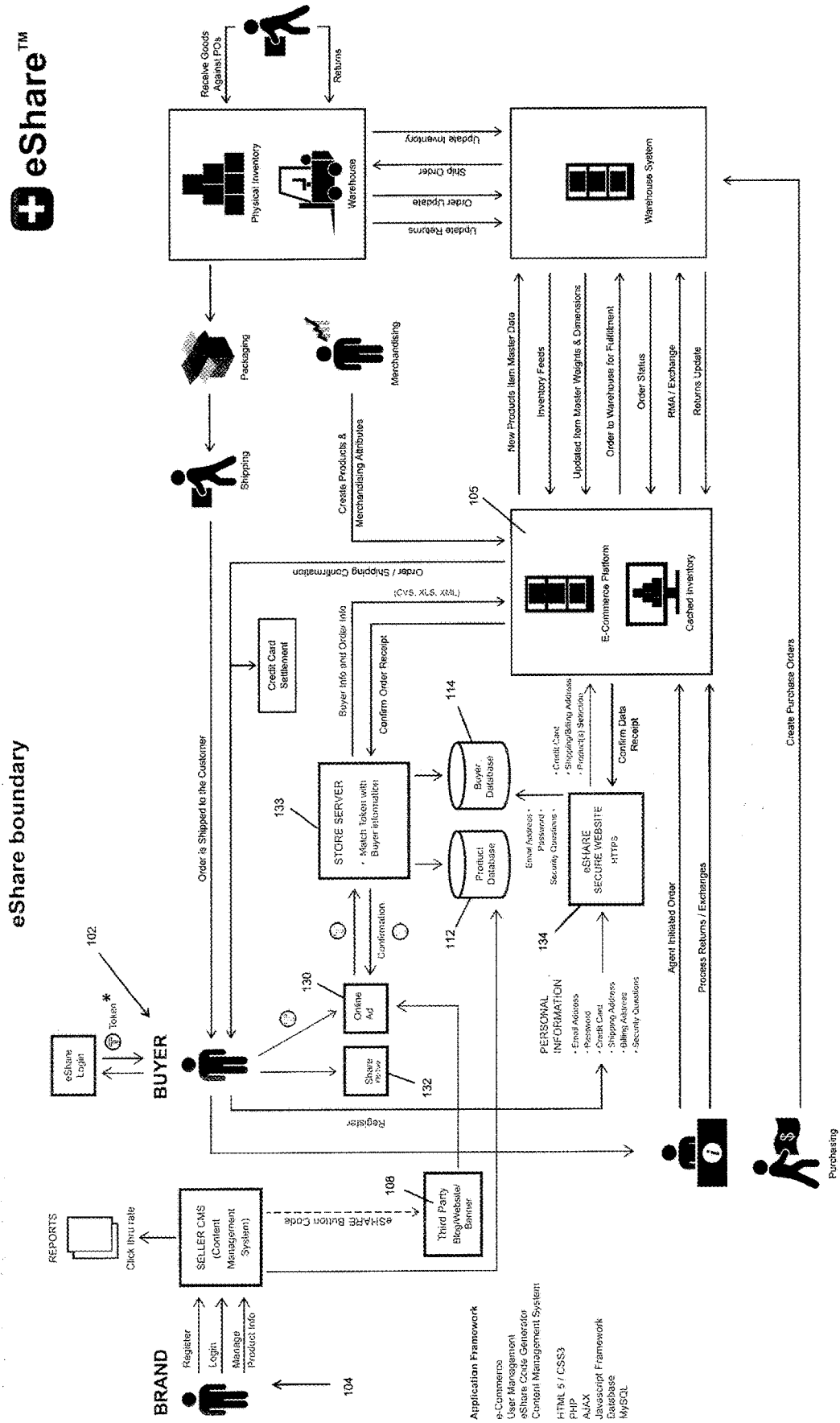
FIG. 22 illustrates a typical buying transaction using a system according to the present invention.

Referring now to FIG. 22, a typical transaction using a system according to the present invention is illustrated. FIG. 22 is based on the payment settlement scheme of FIG. 21. Thus, FIG. 22 illustrates a seller 104 setting up an online ad for display with a content page (e.g. third part blog, web page, banner etc.) using a system according to the present invention. The online ad 130 would be presented to a buyer via a display associated with buyer's computer 102. The online ad 130 could be in any suitable format. Buyer could then either share the ad by selecting (e.g. clicking on) the share button 132 associated with the ad and/or click a buy button associated with online ad 130 to initiate the e-commerce transaction without directing the browser away from the third party service (e.g. without leaving the blog or the website that previously displayed ad 130) as described above.

If the buyer's computer is a registered computer registered with CMS 106 it may be provided with a token. A token is a cookie stored in buyer's computer 102 that identifies the buyer to CMS 106 and enables the buyer to buy through the AJAX interface. CMS 106 then receives the token from buyer's computer 102 and with a store server 133 checks to determine if the buyer's computer 102 is found in buyer's database 114. If so, a confirmation message may be sent to buyer's computer 102. If not, a message may be sent to buyer's computer 102 informing the buyer of the need to register and directing the buyer to register with the system.

If it is determined that the buyer is registered, CMS 106 sends the order information and buyer's information (including payment information) to seller's system 105. Seller's system 105 will then send a confirmation message to CMS 106 that the order has been received. Thereafter, seller's system 105 will take the steps described above for accepting or rejecting the order.

If it is determined that the buyer is not registered, the buyer's registration information, including payment information, will be received by a registration server 134 from buyer's computer 102. CMS 106 will store, preferably, only the buyer's information such as the buyer's e-mail address, password, security questions. Preferably, CMS 106 will not retain and store any payment related information, such as credit card information. The payment information will be sent to seller's system 105 for settlement by a settlement processor 127 along with the buyer's information and order information for processing as previously described. In this example, after CMS 106 sends a message to buyer's computer 102 that the order has been accepted, seller's system 105 will carry out the post-sale activities directly with the buyer without further participation by CMS 106. For example, a confirmation e-mail (confirming that the order has been processed) or an e-mail indicating that the product has been shipped will be sent directly from seller's system 105 to the buyer's e-mail. Moreover, returns, exchanges etc. will be handled by seller's system 105 through direct interaction with the buyer, without CMS 106 acting as an intermediary. FIG. 22 illustrates the post-sale transactions and other seller-side activities schematically.

Seller's system 105 may send to CMS 106, and CMS 106 may receive from seller's system 105, shipment details. The shipment details will be used by CMS 106 to update the records stored at CMS 106. Shipment details may be sent by seller's system 105 periodically. For example, when the product is shipped, a message may be sent to CMS 106, and also when the product is received by the buyer a message may be sent to CMS 106 indicating that the product has been received. The message may then be used to update the records stored at CMS 106.

Shipment details are not necessary when no shippable product is purchased. For example, when an electronically deliverable product (for example, software, music, movies, photographs, games) or electronically accessible service (e.g. electronically accessible service to a publisher's website) is purchased from seller's system 105 through a system according to the present invention CMS 106 may not receive any further messages from seller's system 105 after the sale is completed. In such a case, seller's system 105 may retain information related to the purchase (e.g. buyer's e-mail address and payment information) and may not otherwise provide any further information to CMS 106 after the sale is concluded. That is, seller's system will not send a confirmation that the electronically deliverable product has been delivered to CMS 106 when the product is sent to the buyer (e.g. when the product is electronically sent to the buyer's e-mail or when electronic access is provided to the buyer to access a publication electronically).

As explained and described above CPC 110 and seller's CPC 122 each includes subsystems that are in communication so that they may be updated and synched. For example, CPC 110 and seller's CPC 122 each includes a database server or a plurality of database servers that host a number of corresponding databases when synched (see FIG. 19 and associated description).

Furthermore, as explained and described above, CPC 110 and seller's CPC 122 are in communication with one another, whereby, for example, CPC 110 can leverage some functions of seller's CPC 122 to carry out an e-commerce transaction.

Figure 23:
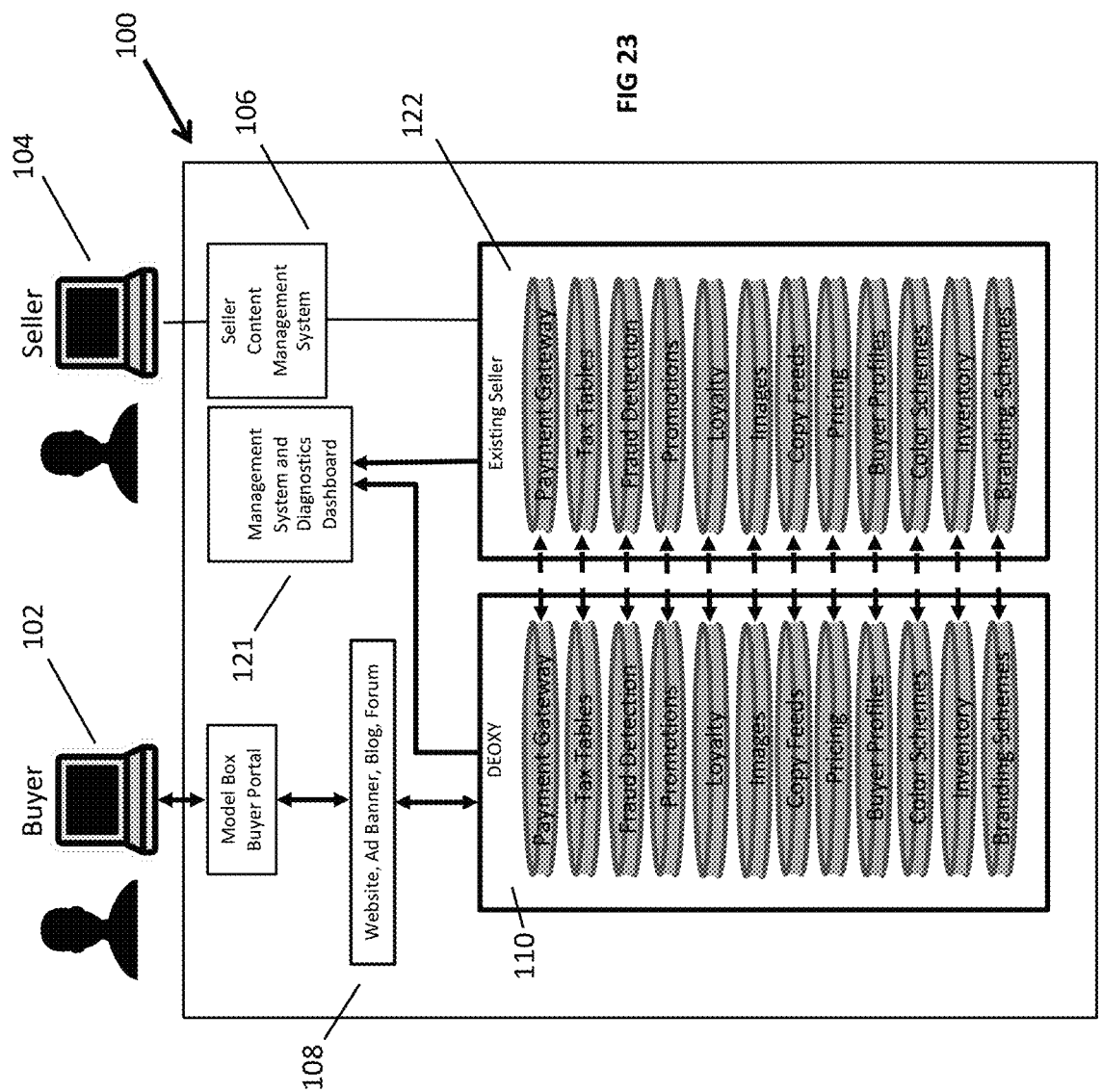
FIG. 23 illustrates a system according to the present invention with additional functionalities.

Referring to FIG. 23, in which like numerals identify like features, CPC 110 and seller's CPC 122 in a system 100 may each further include e-Commerce functionalities, including, for example:

Payment Gateway
Tax Tables
Fraud Detection
Promotions
Loyalty
Images
Copy Feeds
Pricing
Buyer Profiles
Color Schemes
Inventory
Branding Schemes Each functionality may be a system enabled by a computer or a plurality of computers to perform a function related to an e-commerce transaction.

Payment Gateway is a system that processes the payment method and accepts or denies payment. Some examples of payment methods are Visa, MasterCard, American Express, PayPal, as well as alternative and flexible payment options that include but are not limited to, Amazon Pay, Google Pay, Apple Pay, Samsung Pay and others.

Tax Table is a system that provides up-to-date, regionally-specific tax totals based on product category and spending thresholds. The most up-to-date tax tables and tax calculations are provided directly via the eCommerce platform or via third party systems that are integrated with the eCommerce platform. For example, taxes are calculated at a different rate in New York than in Maryland. For example, clothing and footwear costing less than $110, 0% is charged. For apparel above $110, 8.75% is charged. Services are taxed, but gratuities on services are not taxed. A tax calculation system is required to provide correct, timely, up-to-date tax totals for online purchases.

Fraud Detection is a system that accepts or declines a transaction based on algorithms that assess legitimate or fraudulent activity. For example, if an item is being bought by someone known to conduct fraudulent transactions, the transaction might be declined, or if an item is being shipped to an address, but is being purchased by an IP address or using a card based in a country other than the U.S.A., the transaction might be declined. Another example might be if the buyer has made an unusually high number of purchases on other websites, the fraud system might flag that as a potential high-threat transaction for the seller.

Promotions is a system that allows the merchant to offer incentives to induce a buyer to conduct a transition. For example, discount codes or buy-one-get-one are common promotions.

Loyalty Program (sometimes called "CRM") is often a third party, "big data", system that allows the seller to create marketing programs designed to attract and retain customers. The goal is to convert new visitors into spending customers, to compel low spenders to spend more, and to reactivate dormant customers who have not made a recent purchase. Often this includes "joining a club" or enrolling in a points-based incentive program that enables sellers to track and analyze customers and their purchase history.

Images is a system that provides the product images to the buyer.

Copy Feeds is a system that provides the short/medium/expanded product copy and the dynamic copy within the product window.

Pricing is a system that provides the price on the product page, which is frequently updated and may change dynamically based on sale/regular pricing incentives as well as through other promotions.

Buyer Profiles is a system that provides any attribute or combination of attributes that may change on the page due to the particular buyer or set of buyers Color Schemes is a system that provides the brand-specific page attributes. For example, one seller might have royal blue with white text as their brand colors, while another seller might use British racing green with black text. This changes based on the seller.

Inventory is the system that provides the data feed necessary to determine that there are products in the inventory to sell. If a product is in stock, it is readily available to ship. If it is not in stock, it is unavailable or available for pre-sale.

Branding Schemes is the system that provides the data feed that provides the logos, text styles, T&C's, animation or any other type of branding attribute.

The e-commerce functionalities of CPC 110 and seller's CPC 122 may be integrated and in communication. It is important to ensure that the e-commerce functionalities of CPC 110 and seller's CPC 122 are in sync and that the information obtained by CPC 110 from seller's CPC 122 is up to date and correct. From the seller's perspective, knowing whether the e-commerce functionalities are working efficiently and properly is valuable.

Accordingly, CPC 110 is further configured (programmed) to include a diagnostics tool to perform diagnostics on the e-commerce functionalities residing on CPC 110 and seller's CPC 122 automatically. The purpose of the diagnostics tool of CPC 110 is to provide insights into the health and performance of the various e-Commerce functionalities, and to measure the level of performance of the e-commerce functionalities performed by system 100.

To provide correct information from a seller, CPC 110 will make frequent and automatic data calls to the seller's CPC 122. Examples of necessary data links between various functionalities of CPC 110 are shown in FIG. 23. To prevent latency issues, data calls cannot be performed constantly (continuously) and will only happen at regular intervals, unless a pressure test is conducted, as further discussed below.

The purpose of issuing the data calls is to check the status of the various systems, or to confirm the results of a previous data call. The seller can use the information obtained from the data calls to confirm that all necessary e-commerce systems are working properly and using correct and up-to-date data.

A dashboard 121 can provide information to the seller, or the operator of CPC 110. The dashboard 121 is a software enabled visual interface that displays information to the user via a monitor, and may also display forms to receive information from the user or action buttons to receive instructions from the user via a keyboard, for example.

For example, if dashboard 121 shows that the latency of the payment gateway is below an acceptable threshold, the seller can take corrective action.

For example, if the product images (images) are not rendering properly, the images might not appear in the correct resolution, might take too long to load or might not appear at all within the shopping window. The seller could troubleshoot to confirm that the images are properly sized, and that seller site updates have not caused the issue.

Figure 24E:
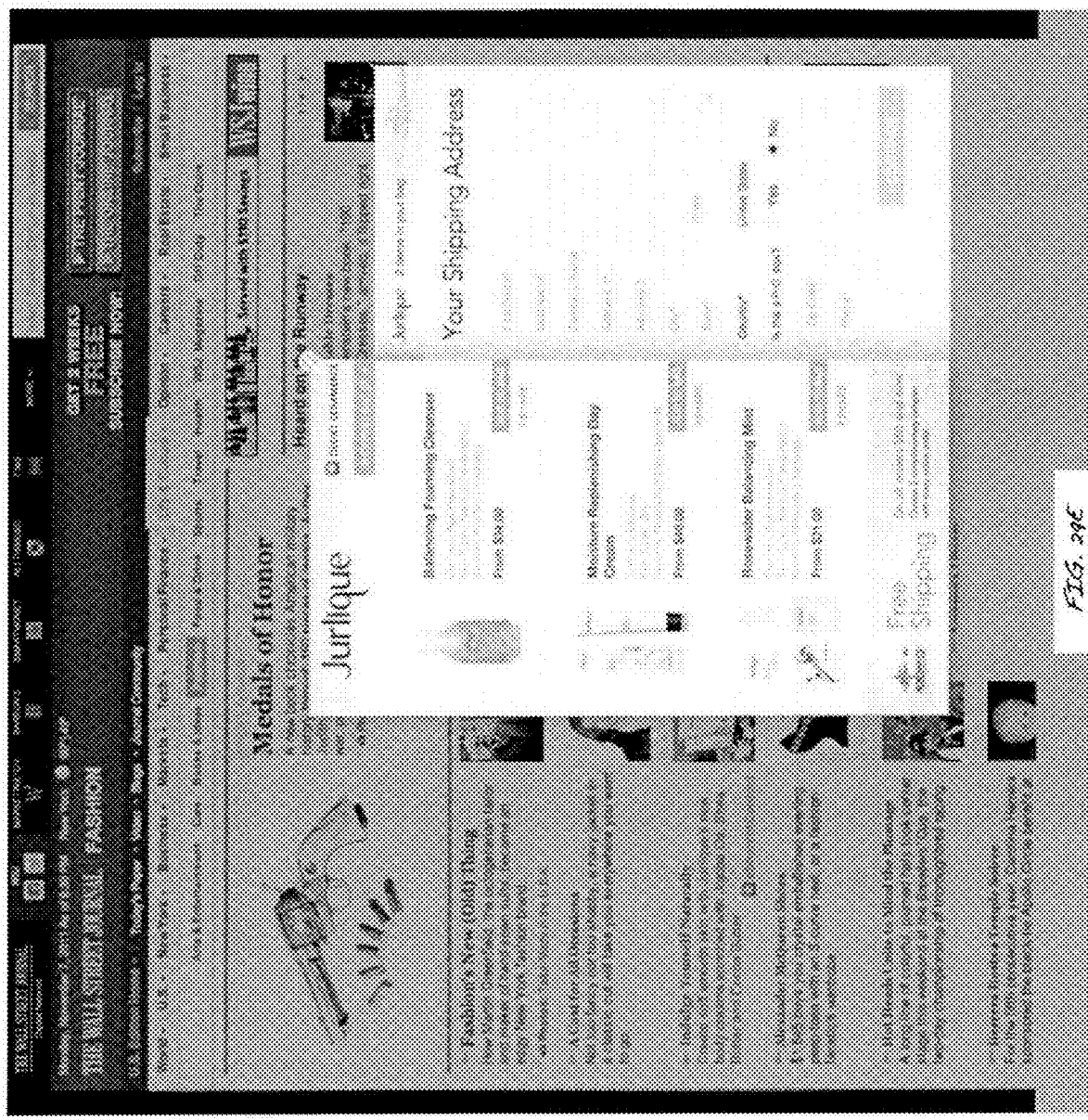
FIG. 24 shows an example of an output of the diagnostics functionality of a system according to the present invention.
Figure 29F:
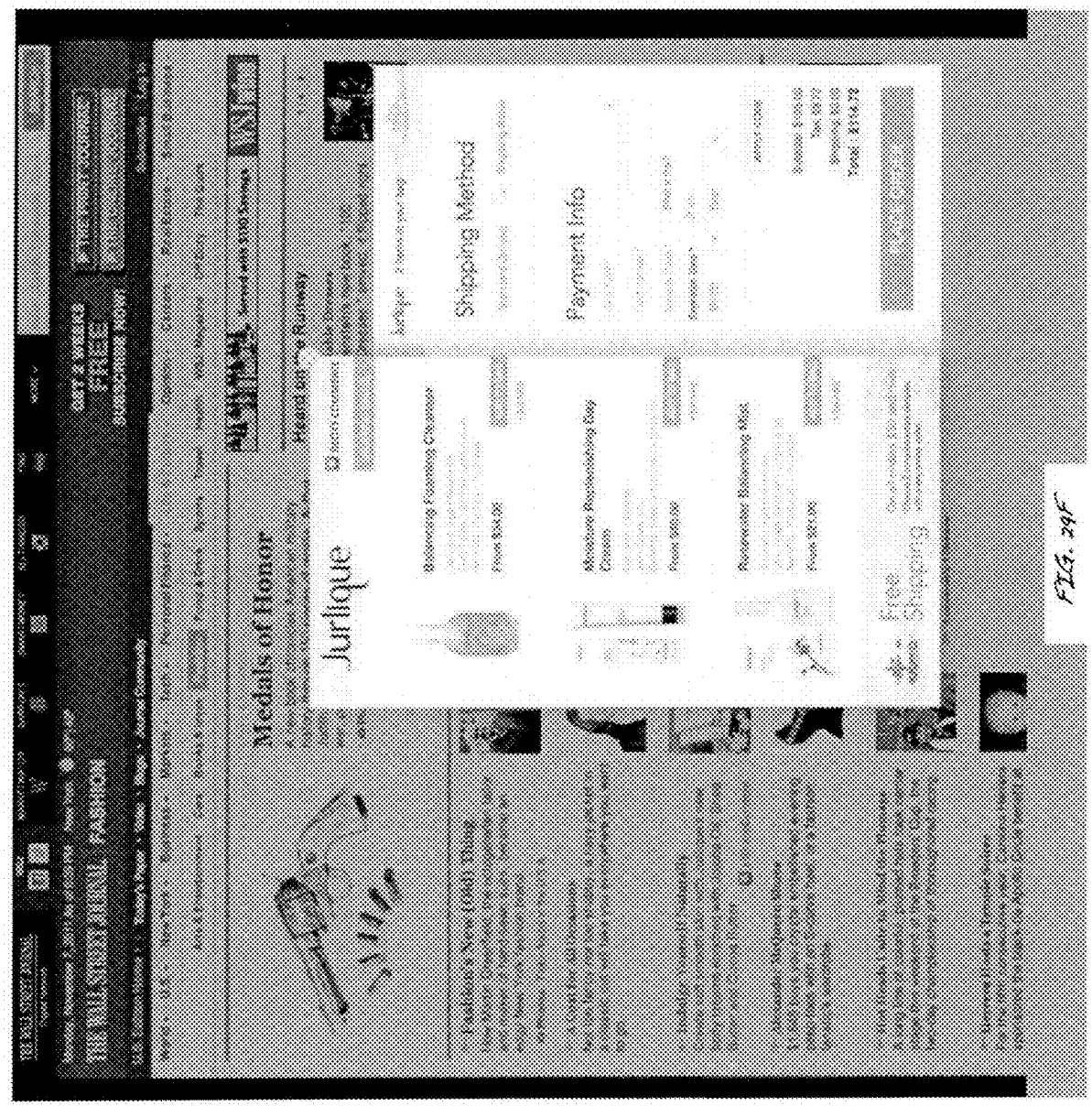

To confirm that the corrective action was successful (for example, the speed of the payment gateway has improved), the seller could conduct a "pressure test" that would make an immediate data call to the integrated systems in advance of the next scheduled, and automatic data call. The diagnostics tool of CPC 110 is configured to permit a user (e.g. the seller or the operator of CPC 110) to conduct a pressure test in advance of the next scheduled and automatic data call. Specifically, the dashboard 121 may be configured to permit a user (the seller or the operator of the CPC 110) to conduct a pressure test of each e-commerce functionality and to receive the results for each pressure test. The dashboard 121 may be displayed by a computer monitor. Instructions to the dashboard may be issued by any man-to-machine interface such as a keyboard. The pressure test may actively push a data call to all or a selected number of the integrated e-commerce functions, may generate a report that will include the result(s) of the data call(s), and may provide the report via (i.e. a visual display) to the user who is conducting the pressure test. An example of a report so generated is shown in FIG. 24, which may be displayed to a user by a monitor or the like device. This visual display could be part of the dashboard 121 that is displayed to the user, or may be a different dashboard. The results of the pressure test could also be saved in CPC 110 or seller's CPC 122.

The pressure test will help to identify and visualize the performance, the latency, and the connectivity at different integration points of CPC 110 and seller's CPC 122, will allow a user (e.g. the seller or the operator of CPC 110) to troubleshoot problems at the points of e-commerce functionality integration of CPC 110 and seller's CPC 122.

Two objectives are accomplished by the pressure test.

First, a visual report is obtained to inform the user how well the e-Commerce functionalities are working, particularly in advance of a high-volume marketing campaign.

Second, if there are problems with the e-Commerce functionalities, the dashboard will provide insights into which integration point is underperforming, thereby assisting the user in selecting the necessary, and actionable steps to resolve the identified issues.

For example, as a result of a pressure test of Tax Tables functionality, the seller's e-Commerce team or the operation team of CPC 110 will receive an alert via a visual display and/or an SMS that the CPC 110 has not received a communication with the tax software for the past 24 hours, which can adversely affect the accuracy of the tax calculations. With this information, the relevant team can troubleshoot the cause. For example, the problem could be that the integration/communication between the tax functionality of CPC 110 and seller's CPC 122 has been severed and is no longer providing updated data, or, that the tax software subscription has lapsed.

The seller's management team, or the management team operating CPC 110, could, for example, receive an alert that a product or a branding image within the shopping experience loads extremely slowly, which could be a result of improper image sizing, or it could be due to a bottleneck with the web host.

FIG. 24 shows an example of the diagnostics output provided by system 100 to a terminal (monitor).

It should be noted that a system as described herein is not limited to a CPC 110 and one seller's CPC 122, and that the system may include multiple, independent and unrelated seller CPCs in communication with CPC 110.

As disclosed above, a system 100 permits a seller to create CEC that permits an e-commerce transaction initiation through a window, displayed to a buyer, by an online publisher's page (e.g. a blog) without directing the buyer's browser to another online publisher's page.

A seller can devise CEC for a number of seller's products, which are stored in a library of CPC 110. Thus, a library or libraries of many different products, and brands can be created and stored in CPC 110. Each such seller library may be linked or associated with a seller product database 112, so that the updating of one updates the other. Each seller library may be rendered accessible to a third party, such as a blogger, a web master, or any other online publisher. A system 100 according to the present invention may be further configured (programmed) to permit a publisher, a webmaster, a blogger or any other third-party to search a product library created by a seller residing on CPC 110. The third party may then select one or more of the products and CPC 110 is programmed to create CEC for the third party that would permit at least the initiation of an e-commerce transaction through a window displayed by the third party's page without directing the buyer's browser to another publisher's page, as described above.

For example, a blogger who wants to feature items related to coffee may access system 100, and in particular CPC 110, and search in a seller's library or sellers' libraries for coffee items. The third party may search by, for example, brand, by generic item descriptions, or a variety of search terms. The items available in the seller's library or sellers' libraries will appear and, once the blogger selects an item to feature on the blogger's blog page, CEC is generated. The blogger can then insert (embed) the generated CEC in a page as described above, enabling online shopping that includes initiating and carrying out an e-commerce transaction through a window or windows displayed by the page in which the CEC is inserted (embedded) without leaving the page in which the CEC is inserted (embedded).

Figure 25A:
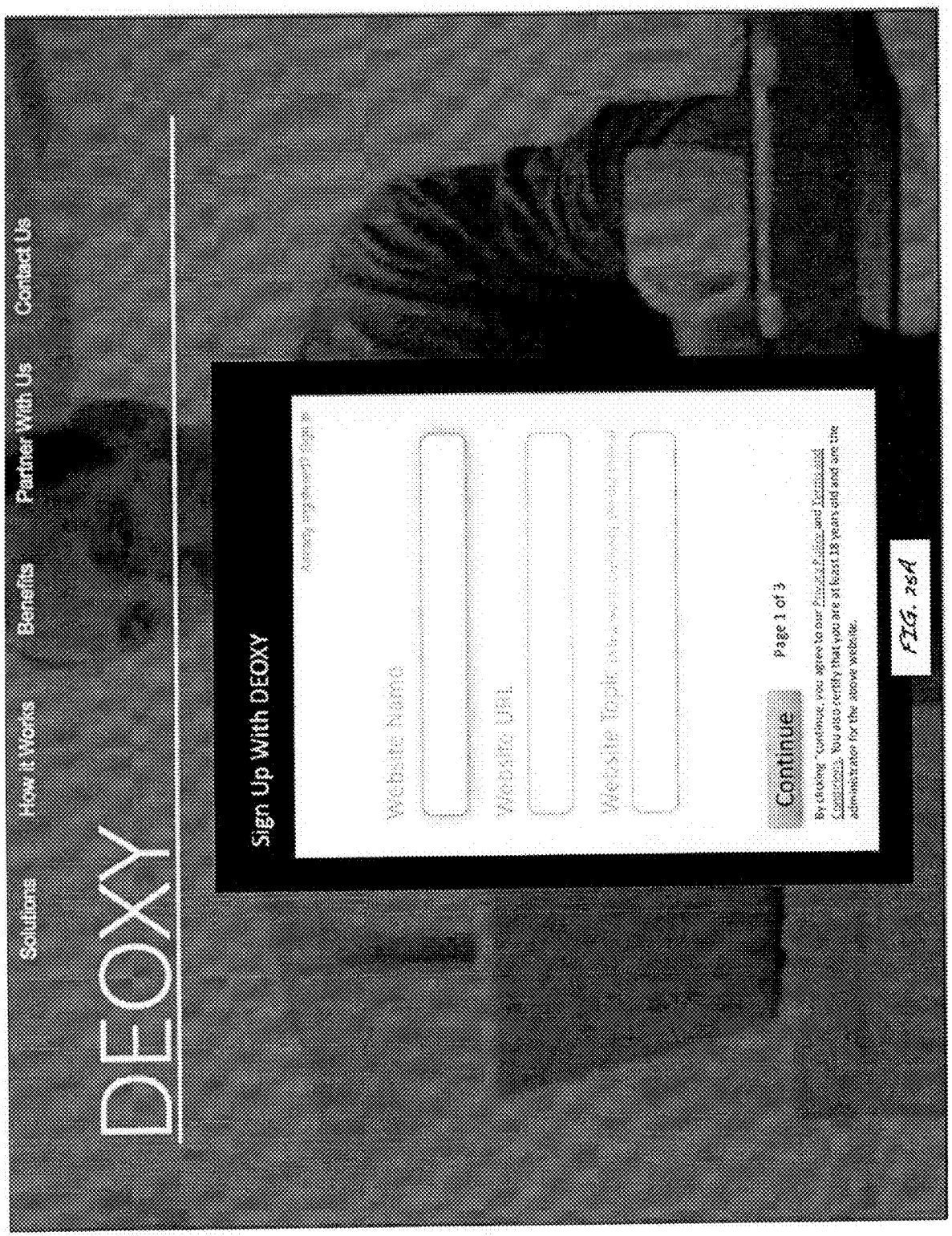
FIGS. 25A-25C show examples of online user interfaces that permit a third party publisher to access the product libraries residing on the system.
Figure 25B:
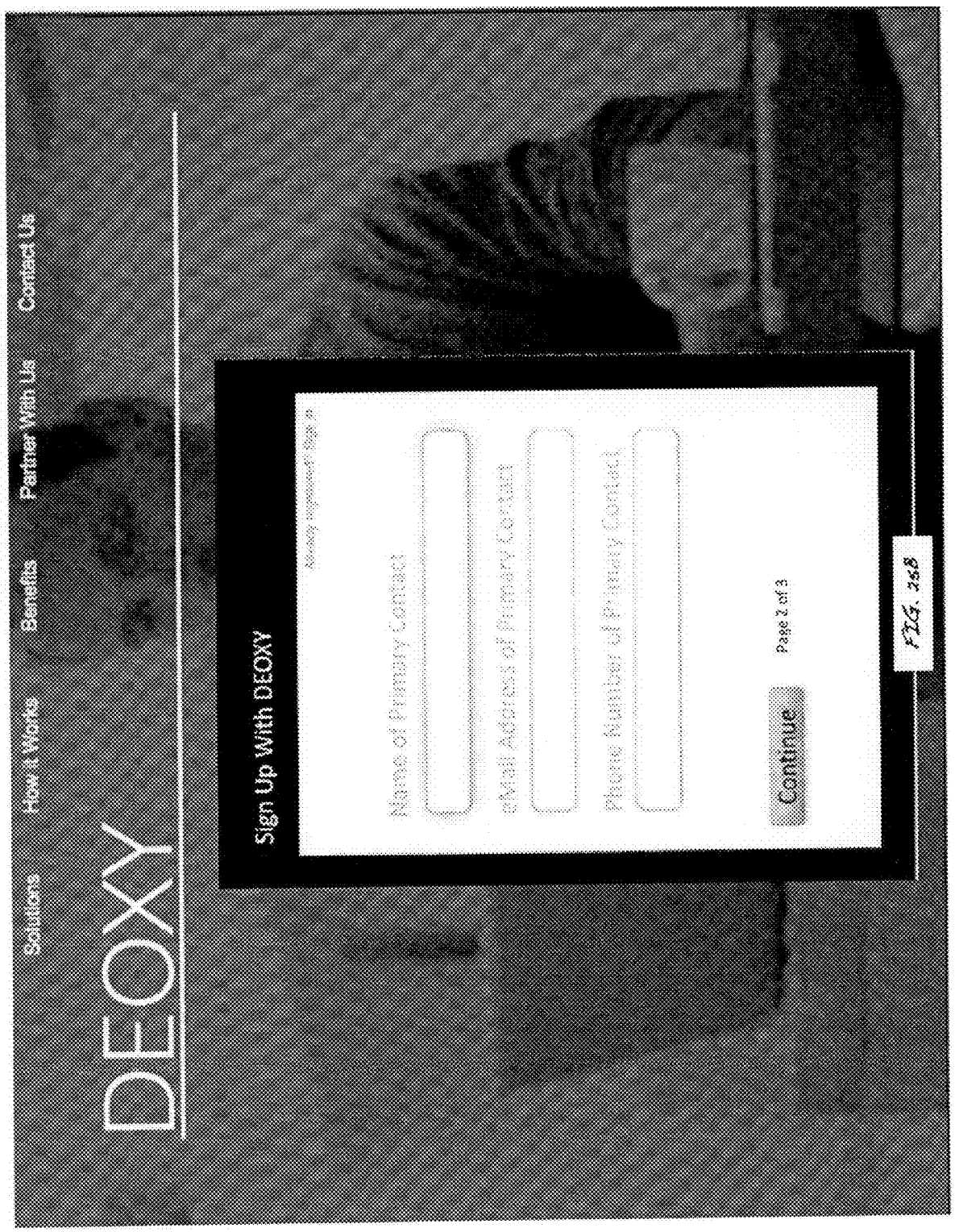
Figure 25C:
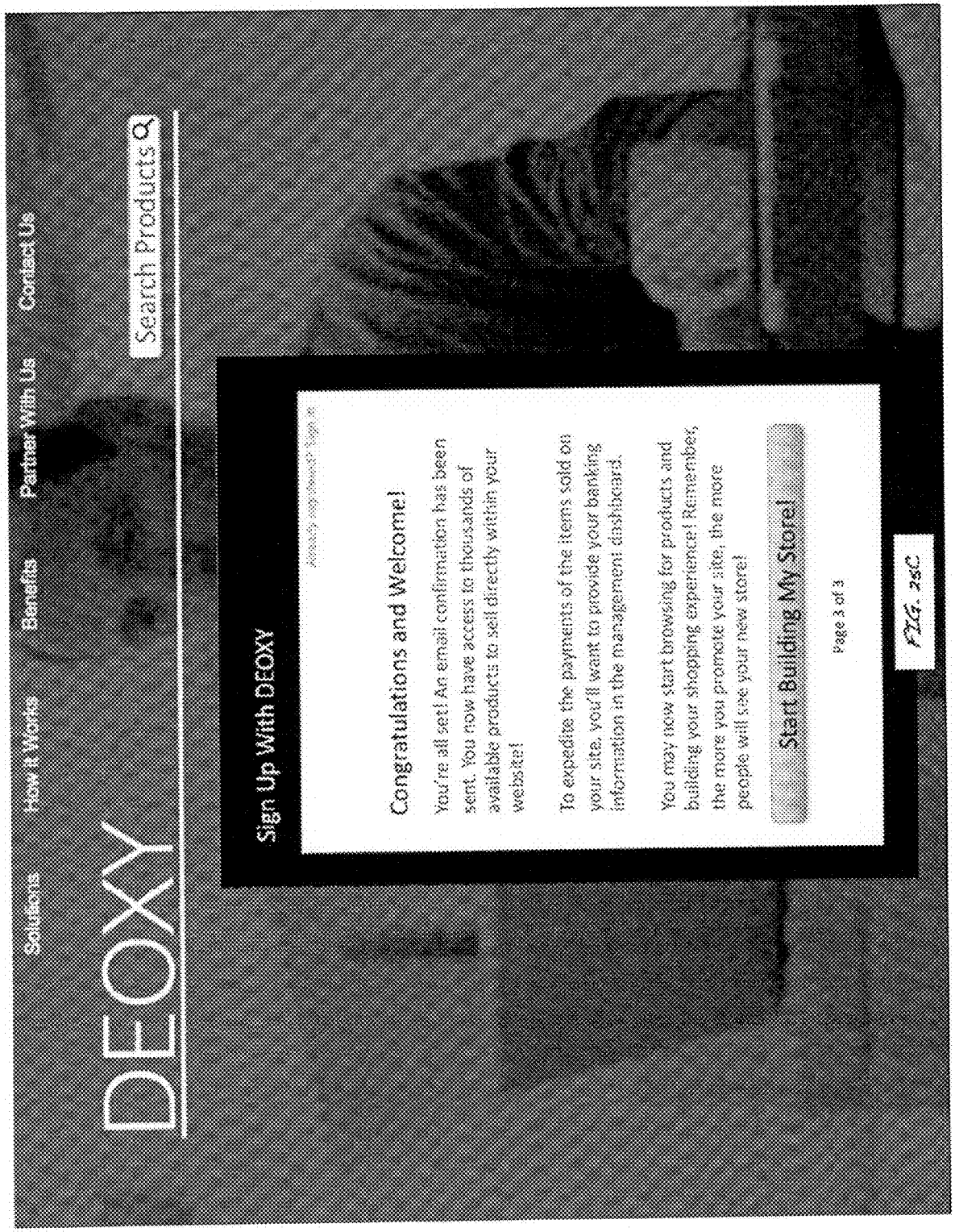

In one embodiment, first a third party publisher (e.g. a blogger) may be registered with system 100. To register, online forms may be displayed to the blogger via a computer terminal to enable the blogger to access the system 100, and specifically CPC 110. Examples of such forms are shown in FIGS. 25A-25C.

Figure 26:
FIG. 26 shows an example of a page displaying product search results to a third party publisher.

Once the blogger is permitted to access CPC 110, a page displaying various products may be displayed for the blogger to select one or more products. An example of such a page is shown in FIG. 26. The displayed products may also be the result of a search of a seller's product library or sellers' product libraries.

Referring to FIG. 27, products selected by the blogger may be displayed in another display window 156, and the blogger may select a displayed product by clicking the ADD TO STORE action button 158 associated with the displayed product. An action button 160 is provided, and when clicked, generates the CEC that permits an e-commerce transaction to be at least initiated through a window and conducted through a window (or windows) without directing the browser of the buyer to another page, as disclosed above.

FIG. 28 shows a page that may result when action button 160 is clicked to generate the CEC, for a product. An example of the generated code appears in window 162, which may be copied by clicking the copy code action button 164. The page shown in FIG. 28 may display additional information about the product as well. The CEC so generated may be embedded/inserted within the publisher's (blogger's) CMS and or advertising platform.

Figure 29:
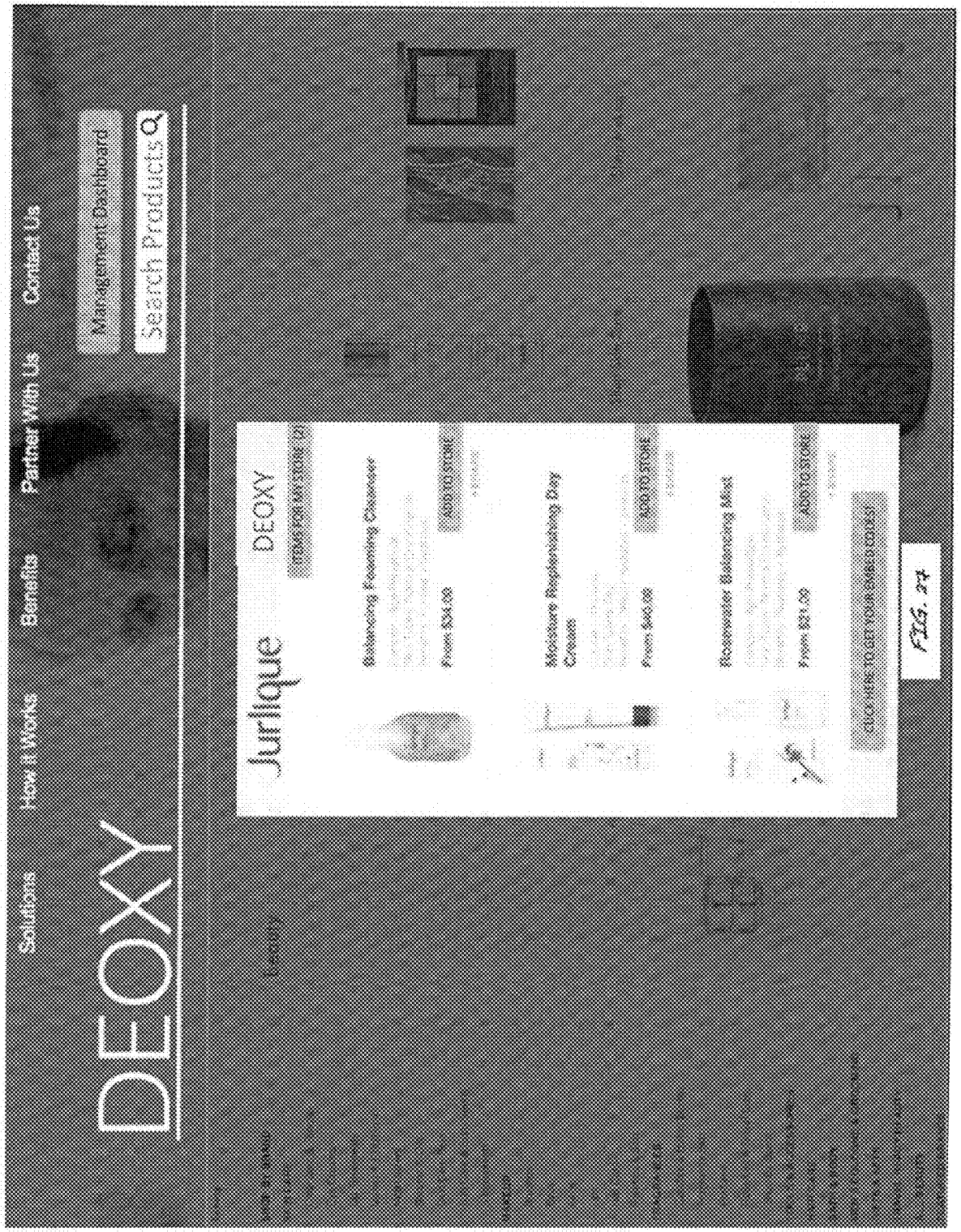
FIG. 29A shows an example of a third party publisher's page having an action button that allows a buyer to initiate an e-commerce transaction through a window without leaving the page.
FIG. 29B shows an example of a first (initial) window that is displayed to the buyer after clicking the action button that starts an e-commerce transaction (FIG. 29A) without leaving the third party publisher's page (FIG. 29A).
FIGS. 29C-29F show examples of windows generated and displayed to the buyer to conduct an e-commerce transaction without leaving the third party publisher's page (FIG. 29A).
Figure 29B:
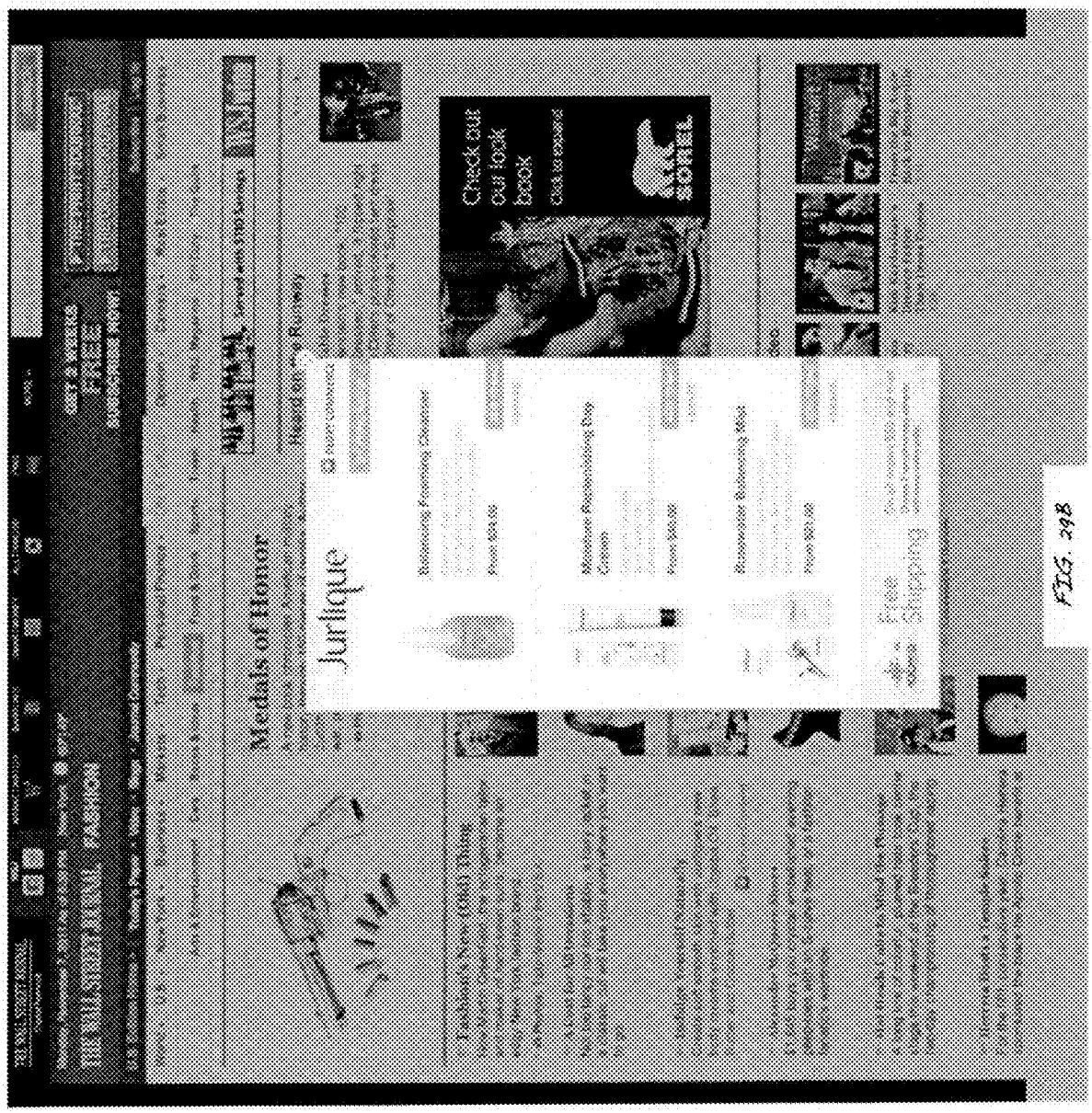
Figure 29C:
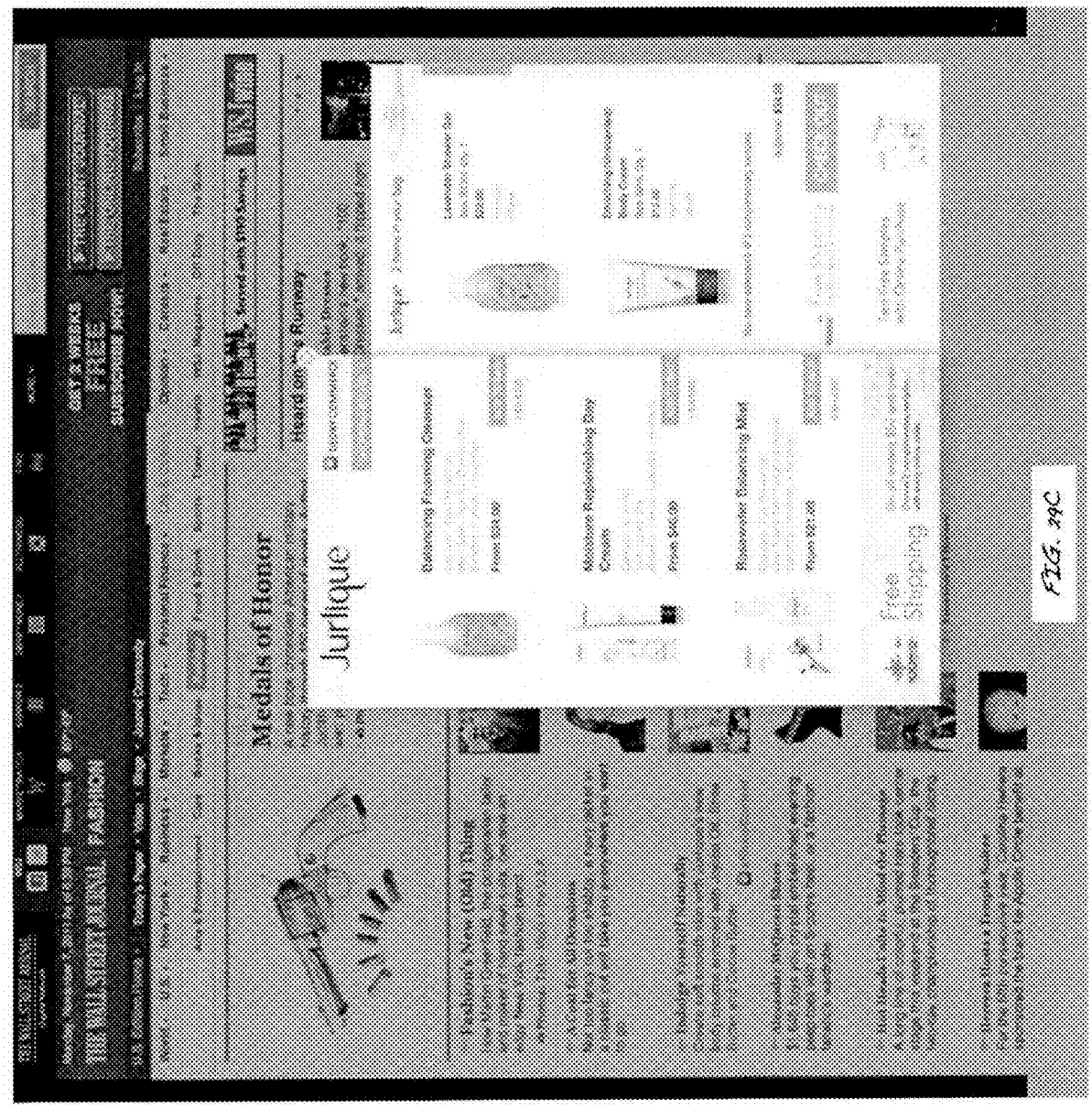
Figure 29D:
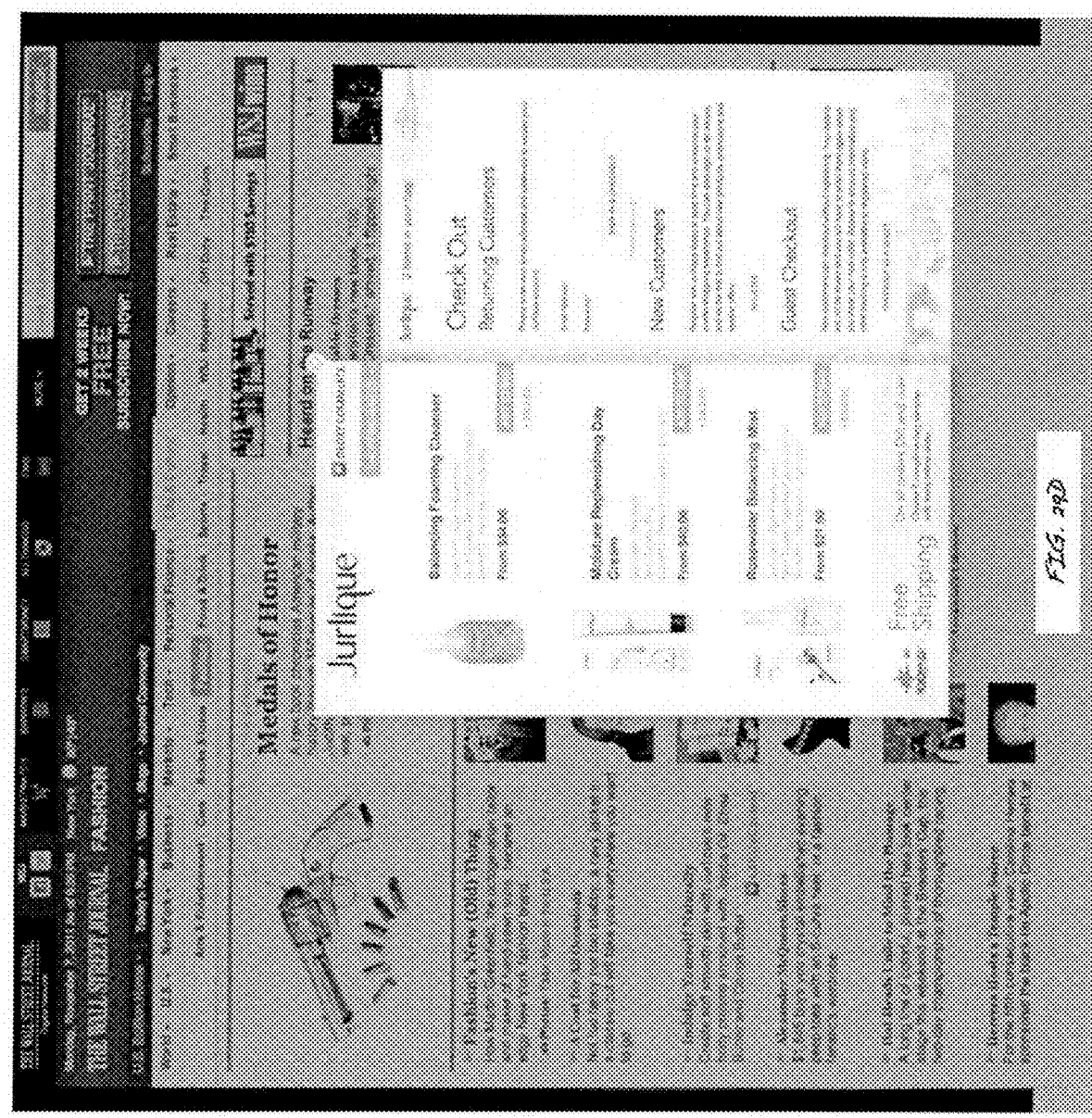

FIG. 29A shows an example of a publisher's page enabled by a CEC generated as described above. By clicking on the action button 166, an e-commerce transaction is initiated through a window (see FIG. 29B) and carried out through a series of displayed windows, examples of which are shown in FIGS. 29C-29F. The windows shown in FIGS. 29B-29F are similar to the windows shown in FIGS. 1-7 and permit a buyer to initiate and conduct an e-commerce transaction without redirecting the buyer's browser to another page.

It should thus be noted that a system according to the present invention can be used to enable e-commerce transactions involving shippable products, electronically deliverable products, electronically accessible services, and any other product or service that can be bought through an e-commerce transaction.

The software platforms and programs mentioned in this document are examples only. It should be understood that other software programs and platforms can be use to implement a method or devise a system according to the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A computer-implemented system that comprises: a central processing system associated with an intermediary and comprising at least one central processing computer or a plurality of central processing computers, the central processing system being in operative communication with a) a seller system associated with a respective seller of a product or a plurality of products, the seller system comprising at least one seller computer or a plurality of seller computers, b) a plurality of user computers, and c) a plurality of publisher systems each associated with a respective online publisher and each comprising at least one publisher computer or a plurality of publisher computers, all the computers being configured to communicate via a computer accessible communication network, and at least one user computer from the plurality of user computers being configured with a computer executable code (a) to display content by an associated computer display, which is connected to the at least one user computer, (b) to receive instructions from a user via a user interface, and (c) to communicate with the central processing system to conduct an E-commerce transaction with the central processing system to purchase a product of the seller, the computer executable code being configured to be transmittable from an electronic publishing page provided by one of the publisher systems when the electronic publishing page is accessed by the at least one user computer, the computer executable code, when executed by the user computer, does not redirect the at least one user computer from the electronic publishing page to another web page, the content includes at least one information section having information related to a seller's product and an action button, the action button, when selected by the user with user interface initiates an E-Commerce transaction by generating an order for the product, the computer executable code enables the display of an information display window by the computer display associated with the at least one user computer along with content of the electronic publishing page, the information display window displays the action button and the information related to the product, wherein the seller, the online publishers, and the intermediary are not associated with one another, wherein the central processing system is configured to receive an order for the product placed through the window from the at least one user computer by the central processing system, and wherein the central processing system is configured to perform an E-commerce transaction by at least processing the order with at least one of the central processing computers and the seller system of the seller of the product, wherein the central processing system includes a plurality of intermediary subsystems, and the seller system includes a plurality of seller subsystems, wherein each seller subsystem corresponds to a respective intermediary subsystem, wherein the central processing system and the seller system are configured to interact to synch the subsystems; and wherein the seller subsystems and the intermediary subsystems are e-commerce systems that enable e-commerce functionalities.

2. A system according to claim 1, wherein the computer accessible communication network includes a plurality of networked computers.

3. A system according to claim 1, wherein the central processing system is configured to perform diagnostics on the e-commerce systems automatically and periodically.

4. A system according to claim 3, wherein at least one of the e-commerce systems is a payment gateway.

5. A system according to claim 3, wherein at least one of the e-commerce systems is a tax table system.

6. A system according to claim 3, wherein at least one of the e-commerce systems is a fraud detection system.

7. A system according to claim 3, wherein at least one of the e-commerce systems is a promotions system.

8. A system according to claim 3, wherein at least one of the e-commerce systems is a loyalty system.

9. A system according to claim 3, wherein at least one of the e-commerce systems is an images system.

10. A system according to claim 3, wherein at least one of the e-commerce systems is a copy feeds system.

11. A system according to claim 3, wherein at least one of the e-commerce systems is a pricing system.

12. A system according to claim 3, wherein at least one of the e-commerce systems is a buyer profiles system.

13. A system according to claim 3, wherein at least one of the e-commerce systems is a color schemes system.

14. A system according to claim 3, wherein at least one of the e-commerce systems is an inventory system.

15. A system according to claim 3, wherein the central processing system is configured to make automatic data calls to the seller system to update the intermediary subsystems.

16. A system according to claim 1, wherein the central processing system is configured to permit a user to issue a data call to at least one of said e-commerce systems.

17. A computer-implemented system that comprises: a central processing system associated with an intermediary and comprising at least one central processing computer or a plurality of central processing computers, the central processing system being in operative communication with a) a seller system associated with a respective seller of a product or a plurality of products, the seller system comprising at least one seller computer or a plurality of seller computers, b) a plurality of user computers, and c) a plurality of publisher systems each associated with a respective online publisher and each comprising at least one publisher computer or a plurality of publisher computers, all the computers being configured to communicate via a computer accessible communication network, and at least one user computer from the plurality of user computers being configured with a computer executable code (a) to display content by an associated computer display, which is connected to the at least one user computer, (b) to receive instructions from a user via a user interface, and (c) to communicate with the central processing system to conduct an E-commerce transaction with the central processing system to purchase a product of the seller, the computer executable code being configured to be transmittable from an electronic publishing page provided by one of the publisher systems when the electronic publishing page is accessed by the at least one user computer, the computer executable code, when executed by the user computer, does not redirect the at least one user computer from the electronic publishing page to another web page, the content includes at least one information section having information related to a seller's product and an action button, the action button, when selected by the user with user interface initiates an E-Commerce transaction by generating an order for the product, the computer executable code enables the display of an information display window by the computer display associated with the at least one user computer along with content of the electronic publishing page, the information display window displays the action button and the information related to the product, wherein the seller, the online publishers, and the intermediary are not associated with one another, wherein the central processing system is configured to receive an order for the product placed through the window from the at least one user computer by the central processing system, and wherein the central processing system is configured to perform an E-commerce transaction by at least processing the order with at least one of the central processing computers and the seller system of the seller of the product, wherein the central processing system includes a plurality of intermediary subsystems, and the seller system includes a plurality of seller subsystems, wherein each seller subsystem corresponds to a respective intermediary subsystem, wherein the central processing system and the seller system are configured to interact to synch the subsystems, and wherein the seller subsystems and the intermediary subsystems comprise a plurality of database servers.

18. A system according to claim 17, wherein the database server of the seller system and the database server of the intermediary system each includes at least a database of the seller's products.

19. A system according to claim 18, wherein the database of the seller's product is associated with a seller's products library, wherein the seller's products library is rendered accessible and searchable by a third party to permit the third party to generate a page that displays products identified by a search of the seller's library, wherein each product identified in the search may be selected by the third party user, wherein each selected identified product will be displayed along with an action button, wherein the action button is configured to issue instructions to the central processing system to generate the computer executable code.

\* \* \* \* \*